US012683145B2

(12) United States Patent
Hoshina et al.

(10) Patent No.: US 12,683,145 B2
(45) Date of Patent: Jul. 14, 2026

(54) ELECTRODE, BATTERY AND BATTERY PACK

(71) Applicant: KABUSHIKI KAISHA TOSHIBA, Minato-ku (JP)

(72) Inventors: Keigo Hoshina, Yokohama (JP); Masanori Tanaka, Kashiwazaki (JP); Hironori Takatsuka, Kashiwazaki (JP); Yasuhiro Harada, Isehara (JP); Norio Takami, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 1223 days.

(21) Appl. No.: 17/004,319

(22) Filed: Aug. 27, 2020

(65) Prior Publication Data

US 2020/0395605 A1 Dec. 17, 2020

Related U.S. Application Data

(63) Continuation of application No. PCT/JP2018/013921, filed on Mar. 30, 2018.

(51) Int. Cl.
*H01M 4/36* (2006.01)
*H01M 4/38* (2006.01)
(Continued)

(52) U.S. Cl.
CPC ............. *H01M 4/364* (2013.01); *H01M 4/38* (2013.01); *H01M 4/48* (2013.01); *H01M 4/623* (2013.01);
(Continued)

(58) Field of Classification Search
None
See application file for complete search history.

(56) References Cited

U.S. PATENT DOCUMENTS

| | | |
|---|---|---|
| 9,825,283 B2 | 11/2017 | Kim et al. |
| 10,629,901 B2 | 4/2020 | Ise et al. |

(Continued)

FOREIGN PATENT DOCUMENTS

| | | |
|---|---|---|
| CN | 103647068 B | 11/2015 |
| JP | 2003-242977 A | 8/2003 |

(Continued)

OTHER PUBLICATIONS

English translation of JP 2015/135770 (Year: 2015).*

(Continued)

*Primary Examiner* — Yoshitoshi Takeuchi
(74) *Attorney, Agent, or Firm* — Maier & Maier, PLLC

(57) ABSTRACT

According to one embodiment, an electrode is provided. The electrode includes an active material-containing layer. The active material-containing layer includes active material particles, a first electro-conductive agent having a fibrous shape, and a second electro-conductive agent having a shape other than the fibrous shape. The active material particles include at least one compound selected from the group consisting of a monoclinic titanium-containing oxide and an orthorhombic titanium-containing composite oxide. The active material-containing layer satisfies formula (1): $0.6 \leq B/A \leq 1.5$. A is a thickness [μm] of the active material-containing layer. B is a maximum length [μm] of the first electro-conductive agent in the active material-containing layer.

10 Claims, 5 Drawing Sheets

(51) Int. Cl.

| | |
|---|---|
| *H01M 4/48* | (2010.01) |
| *H01M 4/62* | (2006.01) |
| *H01M 10/0525* | (2010.01) |
| *H01M 4/02* | (2006.01) |

(52) U.S. Cl.
CPC .. *H01M 10/0525* (2013.01); *H01M 2004/027*
(2013.01)

(56) References Cited

U.S. PATENT DOCUMENTS

| | | | |
|---|---|---|---|
| 2009/0169996 A1* | 7/2009 | Zhamu | H01M 4/0438 977/734 |
| 2009/0176151 A1* | 7/2009 | Kim | H01M 4/587 429/129 |
| 2012/0225346 A1* | 9/2012 | Hoshina | H01M 10/0569 429/341 |
| 2014/0234711 A1* | 8/2014 | Rojeski | H01G 11/50 429/218.1 |
| 2014/0234712 A1* | 8/2014 | Rojeski | H01M 4/70 429/218.1 |
| 2015/0079470 A1 | 3/2015 | Kano et al. | |
| 2015/0129797 A1 | 5/2015 | Ise et al. | |
| 2016/0308263 A1* | 10/2016 | Shevchenko | H01M 10/052 |
| 2017/0309906 A1 | 10/2017 | Ise et al. | |
| 2018/0062158 A1 | 3/2018 | Kim et al. | |
| 2018/0219222 A1* | 8/2018 | Rojeski | H01M 4/1395 |

FOREIGN PATENT DOCUMENTS

| | | | | |
|---|---|---|---|---|
| JP | 2013-33685 A | 2/2013 | | |
| JP | 2015-84323 A | 4/2015 | | |
| JP | 2015-111550 A | 6/2015 | | |
| JP | 2015/135770 | * | 7/2015 | H01M 4/131 |
| JP | 2015-135770 A | 7/2015 | | |
| JP | 2017-84788 A | 5/2017 | | |

OTHER PUBLICATIONS

Extended European Search Report issued Sep. 20, 2021 in European Patent Application No. 18911790.6, 7 pages.
M. Barberio, et al., "Preparation and Photovoltaic Properties of Layered $TiO_2$/Carbon Nanotube/$TiO_2$ Photoanodes Dye-Sensitized Solar Cells" Superlattices and Microstructures, vol. 91, XP029451048, Jan. 8, 2016, pp. 158-164.
International Search Report issued Jun. 12, 2018 in PCT/JP2018/013921 filed Mar. 30, 2018, 2 pages.

* cited by examiner

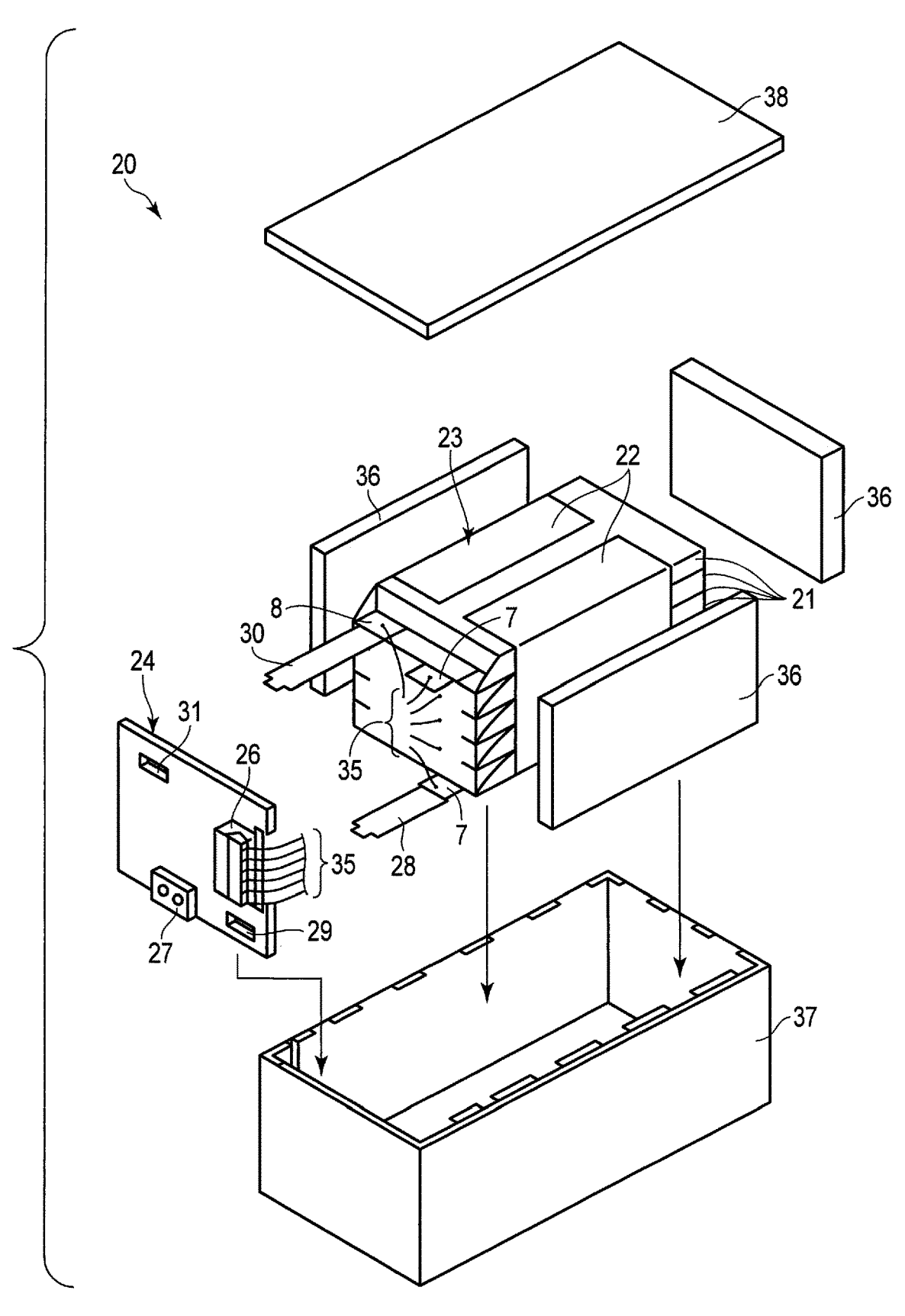
F I G. 7

ELECTRODE, BATTERY AND BATTERY PACK

CROSS-REFERENCE TO RELATED APPLICATIONS

This application is a Continuation Application of PCT Application No. PCT/JP2018/013921, filed Mar. 30, 2018, the entire contents of which are incorporated herein by reference.

FIELD

The present disclosure relates to an electrode, a battery and a battery pack.

BACKGROUND

Nonaqueous electrolyte batteries, which perform charge and discharge by movement of lithium ions between the negative and positive electrodes, have been extensively studied, as a high-energy density battery.

Nonaqueous electrolyte batteries are anticipated to be used as a medium-sized or large-sized power supply for onboard and stationary applications and the like, for example, in addition to the use as a power supply for compact electronic devices. Excellent life performance and high safety are demanded in such medium-sized and large-sized applications. In addition, high input/output performance are also required in such applications.

As an example of a nonaqueous electrolyte battery having excellent life performance and high safety, a nonaqueous electrolyte battery using spinel lithium titanate for the negative electrode is known. However, since the lithium insertion/extraction potential of spinel lithium titanate is as high as about 1.55 V (vs. Li/Li$^+$), battery voltage is low for the nonaqueous electrolyte battery using the spinel lithium titanate for the negative electrode active material.

BRIEF DESCRIPTION OF THE DRAWING(S)

FIG. 7 is a schematic exploded perspective view of one example of a battery pack according to an embodiment.

DETAILED DESCRIPTION

Figure 1:
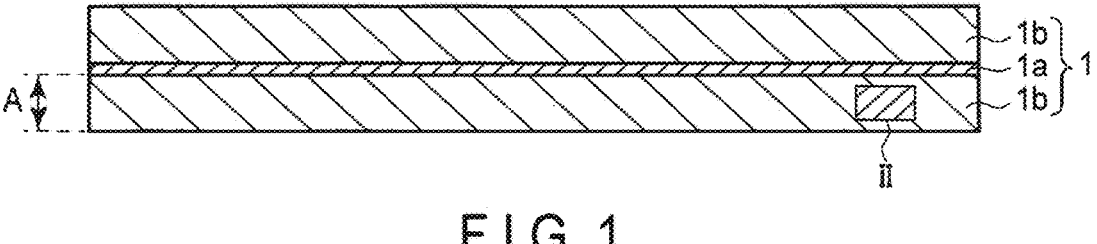
FIG. 1 is a schematic cross-sectional view of one example of an electrode according to an embodiment.

According to one embodiment, an electrode is provided. The electrode includes an active material-containing layer. The active material-containing layer includes active material particles, a first electro-conductive agent having a fibrous shape, and a second electro-conductive agent having a shape other than the fibrous shape. The active material particles include at least one compound selected from the group consisting of a monoclinic titanium-containing oxide and an orthorhombic titanium-containing composite oxide. The active material-containing layer satisfies formula (1): $0.6 \leq B/A \leq 1.5$. A is a thickness [μm] of the active material-containing layer. B is a maximum length [μm] of the first electro-conductive agent in the active material-containing layer.

According to one embodiment, a battery is provided. The battery includes the electrode according to an embodiment as a negative electrode, a positive electrode, and an electrolyte.

According to one embodiment, a battery pack is provided. The battery pack includes the battery according to an embodiment.

The embodiments will be explained below with reference to the drawings. Structures common to all embodiments are represented by the same symbols and overlapping explanations will be omitted. Also, each drawing is a typical view for explaining the embodiments and for promoting the understanding of the embodiments. Though there are parts different from an actual device in shape, dimension and ratio, these structural designs may be properly changed taking the following explanations and known technologies into consideration.

First Embodiment

According to a first embodiment, an electrode is provided. The electrode includes an active material-containing layer. The active material-containing layer contains active material particles, a first electro-conductive agent having a fibrous shape, and a second electro-conductive agent having a shape other than a fibrous shape. The active material particles include at least one compound selected from the group consisting of a monoclinic titanium-containing oxide and an orthorhombic titanium-containing composite oxide. The active material-containing layer satisfies formula (1): $0.6 \leq B/A \leq 1.5$. A is a thickness [μm] of the active material-containing layer. B is a maximum length [μm] of the first electro-conductive agent in the active material-containing layer.

The monoclinic titanium-containing oxide can exhibit a higher theoretical capacity than a spinel lithium titanate. The orthorhombic titanium-containing composite oxide can exhibit a lower lithium insertion/extraction potential than spinel lithium titanate. However, according to extensive and intensive studies, it was found that among batteries including electrodes containing titanium-containing oxides, a battery including an electrode containing a monoclinic titanium-containing oxide or an orthorhombic titanium-containing composite oxide is, in terms of cycle life, inferior to a battery including an electrode containing the spinel lithium titanate if no measures are taken.

As a result of conducting extensive and intensive studies in order to solve this problem, the electrode according to the first embodiment was realized.

The active material-containing layer of the electrode according to the first embodiment includes active material particles including at least one compound selected from the group consisting of monoclinic titanium-containing oxide and orthorhombic titanium-containing composite oxide. The active material-containing layer of the electrode according to the first embodiment further includes a fibrous first electro-conductive agent and a second electro-conductive agent having a shape other than fibrous. The active material-containing layer also satisfies equation (1): $0.6 \leq B/A \leq 1.5$.

3                                                                                      4

The at least one compound selected from the group consisting of the monoclinic titanium-containing oxide and the orthorhombic titanium-containing composite oxide contained in the active material particles may expand and/or contract as Li ions are inserted and/or released. For this reason, when an active material-containing layer including active material particles containing such a compound is subjected to charging and/or discharging, volume change may change occur.

However, in the electrode according to the first embodiment, even when the active material particles expand or contract whereby the volume change of the active material-containing layer takes place, the fibrous first electro-conductive agent having a maximum length of B [μm] can maintain electrical bridging among the active material particles. This is because when the active material-containing layer satisfies the above-described formula (1), each fibrous first electro-conductive agent can be in contact with multiple active material particles, and can maintain contact with multiple active material particles even when the active material particles expand or contract.

The second electro-conductive agent having a shape other than a fibrous shape can electrically bridge the first electro-conductive agents and maintain this electrical bridging even when the active material particles expand or contract. In addition, the second electro-conductive agent is able to be present between active material particles, and therefore aid the first electro-conductive agent in electrically bridging the active material particles. That is, in the active material-containing layer including the first electro-conductive agent and the second electro-conductive agent and satisfying formula (1), even when the active material-containing layer undergoes volume change, the first electro-conductive agent and the second electro-conductive agent can maintain electrical conductive paths between the active material particles. Therefore, even if the battery including the electrode is repeatedly charged and discharged, electrical conductive paths between the active material particles in the electrode can be maintained. When electrical conductive paths between active material particles is maintained, it is possible to suppress an increase in resistance of the electrode, leading to suppression of electrode deterioration. As a result, the electrode according to the first embodiment can realize a battery capable of exhibiting an excellent cycle life.

In an electrode in which the active material-containing layer includes the second electro-conductive agent but not the first electro-conductive agent, when the active material particles expand or contract, the contact between the active material particle and the second electro-conductive agent becomes partially eliminated, and the electrical conductive path at that part becomes disconnected. When the electrical conductive path is disconnected, the resistance of the electrode is increased. Stress builds in an electrode with high resistance when the battery is repeatedly charged and discharged, leading to deterioration. Therefore, the battery including such an electrode is inferior to a battery including the electrode according to the first embodiment in terms of cycle life.

On the other hand, in an electrode in which the active material-containing layer includes the first electro-conductive agent but not the second electro-conductive agent, electrical bridging between first electro-conductive agents cannot be sufficiently achieved. Further, in such an electrode, electrical bridging between active material particles cannot be sufficiently achieved. Therefore, such an electrode exhibits a high resistance value. Stress builds in such an electrode when the battery is repeatedly charged and discharged, leading to deterioration.

In an electrode including an active material-containing layer having a ratio B/A of less than 0.6, the maximum length B of the first electro-conductive agent is too short relative to the thickness A of the active material-containing layer. In such an electrode, when the active material-containing layer undergoes volume change, the first electro-conductive agent cannot sufficiently maintain contact with the multiple active material particles. Therefore, in a non-aqueous battery including such an electrode, when the battery is repeatedly subjected to charging and discharging, resistance of the electrode increases, and the electrode deteriorates.

On the other hand, in an electrode including an active material-containing layer having a ratio B/A of greater than 1.5, the maximum length B of the first electro-conductive agent is too long relative to the thickness A of the active material-containing layer. In such an active material-containing layer, the first electro-conductive agent is apt to be oriented in a direction substantially perpendicular to the thickness direction of the active material-containing layer. That is, the first electro-conductive agent is likely to be contained in the active material-containing layer in a sideways-lying state. Such a first electro-conductive agent cannot form electrical conductive paths in the thickness direction of the active material-containing layer. Therefore, in such an electrode, it is difficult to maintain electrical conductive paths when the active material expands and/or contracts in association with charging and discharging.

For example, spinel lithium titanate has little or no volume change in association with insertion/extraction of Li ions. For carbon material as active material, the carbon material itself has electrical conductivity. Therefore, in an electrode containing a carbon material capable of exhibiting high electrical conductivity as an active material, there is no problem of electrical conductive path disconnection in association with expansion and/or contraction of active material particles. Therefore, for an electrode in which the active material particles do not contain either the monoclinic titanium-containing oxide or the orthorhombic titanium-containing composite oxide, for example, an electrode in which the active material particles are particles of spinel lithium titanate or particles of carbon material, there cannot be achieved the effect of improving cycle life by containing the first electro-conductive agent and the second electro-conductive agent in the active material-containing layer and setting the ratio B/A of the active material-containing layer to be from 0.6 to 1.5. This fact regarding the electrode in which the active material particles are particles of spinel lithium titanate is demonstrated by Comparative Examples 5 to B.

Hereinafter, the electrode according to the first embodiment will be described in more detail.

The electrode according to the first embodiment includes an active material-containing layer. The electrode according to the first embodiment may further include a current collector. The current collector may have, for example, a band planar shape. The current collector may have, for example, a first surface and a second surface as a surface on a side opposite the first surface.

The active material-containing layer may be formed on one or both surfaces of the current collector. For example, the active material-containing layer may be formed on one of the first or second surface of the current collector, or on both the first and second surfaces of the current collector. The current collector may include a portion on which no active material-containing layer is supported. This portion may be used as, for example, a current collector tab. Alternatively, the electrode according to the first embodiment may include a current collector tab that is a separate entity from the current collector.

The active material-containing layer includes active material particles, a first electro-conductive agent, and a second electro-conductive agent. The active material-containing layer may further contain a binder. The binder may have a function of binding the active materials, the electro-conductive agents, and the current collector.

The active material-containing layer has a thickness A [μm]. The thickness A is preferably from 25 μm to 70 μm. An electrode in which the thickness A of the active material-containing layer is from 25 μm to 30 μm is more preferable in terms of being able to realize a high output. Alternatively, an electrode in which the thickness A of the active material-containing layer is from 50 μm to 70 μm is more preferable in terms of being able to realize a higher energy density.

The thickness A [μm] of the active material-containing layer is measured as follows. First, the thickness of the electrode including the current collector and the active material-containing layer is measured by a coating thickness meter. Here, in the case of an electrode in which active material-containing layers are formed on both surfaces of the current collector, the active material-containing layer on one surface is taken off, and the thickness of the electrode obtained in this manner is measured by a coating thickness meter. At the time of measurement, the measurement is performed at ten discretionary points of the electrode, and average thickness $T_E$ [μm] is calculated. Thereafter, the active material-containing layer is taken off from the current collector. The thickness of only the current collector obtained in this manner is measured at ten discretionary points in the same manner as described above, and average thickness $T_c$ [μm] is calculated. The average thickness $T_c$ of only the current collector is subtracted from the average thickness $T_E$ of the electrode including the current collector and the active material-containing layer. The difference obtained in this manner is defined as an active material layer thickness A [μm].

The active material particles may be primary particles, secondary particles, or a mixture of the primary particles and the secondary particles. An average particle diameter C of the active material particles is preferably from 0.8 μm to 20 μm, more preferably from 5 μm to 15 μm.

The BET specific surface area of the active material particles is not particularly limited, but is preferably 5 $m^2/g$ or more and less than 20 $m^2/g$. The BET specific surface area is more preferably from 8 $m^2/g$ to 14 $m^2/g$. Here, as the measurement of the specific surface area, a method is used where molecules, in which an occupied area in adsorption is known, are adsorbed onto the surface of powder particles at the temperature of liquid nitrogen, and the specific surface area of the sample is determined from the amount of adsorbed molecules. The most often used method is a BET method based on the low temperature/low humidity physical adsorption of an inert gas, which is the most well-known theory of the method of calculating the specific surface area in which the Langmuir theory, which is a single-molecular layer adsorption theory, has been expanded to multi-molecular layer adsorption. The specific surface area determined by the above method is referred to as BET specific surface area.

A carbon-containing layer may be formed on the surface of the active material particle. The carbon-containing layer may cover the entire surface of the active material particle, or may be formed on a part of the surface of the active material particle. The active material particles may include secondary particles in which primary particles having a carbon-containing layer formed on a surface thereof are agglomerated.

The first electro-conductive agent is fibrous. The first electro-conductive agent may be bent within the active material-containing layer. The first electro-conductive agent has a maximum length B [μm] in the active material-containing layer.

The maximum length B of the first electro-conductive agent in the active material-containing layer is defined as follows. First, the active material-containing layer included in the electrode to be measured is observed with a scanning electron microscope (SEM) equipped with an energy dispersive X-ray spectrometer (EDX) (SEM-EDX). In the image obtained by this observation, a fibrous component containing carbon is specified as a first electro-conductive agent. Here, a component having an aspect ratio of 20 or more is determined to be fibrous. The largest dimension among the specified first electro-conductive agents is defined as the maximum length B [μm] of the first electro-conductive agent in the image. Note, that if the first electro-conductive agent is bent in the image (in the active material-containing layer), the maximum length B [μm] is specified for a hypothetical state where the bent portion is straightened out.

The same operation is performed on ten images obtained by observing different portions of the active material-containing layer. The average of the maximum lengths B in the ten images is defined as the maximum length B [μm] of the first electro-conductive agent in the active material-containing layer.

The maximum length B is preferably from 16 μm to 40 μm, and more preferably from 21 μm to 35 μm.

The ratio B/A is from 0.6 to 1.5. The ratio B/A is preferably from 0.7 to 1.2, more preferably from 0.8 to 1.

The average fiber diameter of the first electro-conductive agent is preferably from 10 nm to 100 nm, and more preferably from 30 nm to 90 nm. Here, the fiber diameter is measured in the above-described SEM image of the active material-containing layer. Specifically, the smallest dimension of each first electro-conductive agent specified in each SEM image is defined as the fiber diameter of the first electro-conductive agent.

The second electro-conductive agent has a shape other than a fibrous shape. That is, the second electro-conductive agent has an aspect ratio of less than 20. The second electro-conductive agent may have, for example, at least one shape selected from the group consisting of a chained shape, a flake shape (a plate shape, a sheet shape, or the like), a scale shape, and a granular shape (for example, a spherical shape).

An average dimension D of the second electro-conductive agent is preferably from 3 μm to 8 μm, and more preferably from 4 μm to 6 μm.

The content of each component in the active material-containing layer is preferably from 70% by mass to 96% by mass for the active material particles, from 0.5% by mass to 20% by mass for the first electro-conductive agent, from 2% by mass to 20% by mass for the second electro-conductive agent, and from 1.5% by mass to 20% by mass for the binder. In the electrode of this preferred mode, the active material-containing layer can exhibit a more excellent current collection performance, and an excellent binding property between the active material-containing layer and the current collector. In the electrode of this preferred mode, the active material-containing layer can have a more excellent electrical conductive path. As a result, the electrode of this preferred mode can realize a battery capable of exhibiting a more excellent cycle life and a more excellent large current performance. From the viewpoint of a high capacity, the content of each of the first electro-conductive agent, the second electro-conductive agent, and the binder is preferably 20% by mass or less. The more preferred content of each component is from 86% by mass to 92% by mass for the active material particles, from 0.5% by mass to 5% by mass for the first electro-conductive agent, from 2% by mass to 7% by mass for the second electro-conductive agent, and from 2% by mass to 6% by mass for the binder.

The active material-containing layer preferably satisfies formula (2): $0.2 \leq C/B \leq 0.8$. Here, C is the average particle diameter [μm] of the active material particles. The electrode including the active material-containing layer satisfying formula (2) can more sufficiently maintain the electrical conductive path between the active material particles. The ratio C/B is more preferably from 0.3 to 0.6.

In addition, the active material-containing layer preferably satisfies formula (3): $0.5 \leq C/D \leq 10$. Here, D is the average dimension [μm] of the second electro-conductive agent in the active material-containing layer. The ratio C/D is more preferably from 2 to 8.

Next, a description will be given of examples of materials that can be included in the electrode according to the first embodiment.

(1) Active Material Particles

The active material particles include at least one compound selected from the group consisting of a monoclinic titanium-containing oxide and an orthorhombic titanium-containing composite oxide.

The monoclinic titanium-containing oxide is a titanium-containing oxide having a so-called monoclinic crystal structure. Examples of such an oxide include a niobium-titanium composite oxide having a monoclinic crystal structure and a titanium oxide having a monoclinic crystal structure.

Examples of monoclinic niobium-titanium composite oxides include a composite oxide having a composition represented by general formula $Li_x Ti_{1-y} M1_y Nb_{2-z} M2_z O_{7+\delta}$. Here, M1 is at least one selected from the group consisting of Zr, Si, and Sn. M2 is at least one selected from the group consisting of V, Ta, and Bi. Each of the subscripts are respectively within ranges of $0 \leq x \leq 5$, $0 \leq y < 1$, $0 \leq z < 2$, and $-0.3 \leq \delta \leq 0.3$. A specific example of monoclinic niobium-titanium composite oxide is a composite oxide having a composition represented by general formula $Li_x Nb_2 TiO_7$ ($0 \leq x \leq 5$).

Another example of niobium-titanium composite oxide having a monoclinic crystal structure is a composite oxide having a composition represented by general formula $Li_x Ti_{1-y} M3_{y+z} Nb_{2-z} O_{7-\delta}$. Here, M3 is at least one selected from Mg, Fe, Ni, Co, W, Ta, and Mo. Each of the subscripts are respectively within ranges of $0 \leq x \leq 5$, $0 \leq y < 1$, $0 \leq z < 2$, and $-0.3 \leq \delta \leq 0.3$.

Examples of the titanium oxide having a monoclinic crystal structure include titanium dioxide ($TiO_2$) having a monoclinic crystal structure. A part of Ti of the monoclinic titanium dioxide may be substituted with other metal elements. Examples of other metal elements include Al, Sn, Nb, and Ta. If a metal element other than Ti is contained, the oxide can be referred to as a titanium-containing composite oxide having a monoclinic crystal structure.

The orthorhombic titanium-containing composite oxide is a titanium-containing composite oxide having the so-called orthorhombic crystal structure.

Examples of orthorhombic titanium-containing composite oxide include a compound represented by $Li_{2+a} M(I)_{2-b} Ti_{6-c} M(II)_d O_{14+o}$. Here, M(I) is at least one selected from the group consisting of Sr, Ba, Ca, Mg, Na, Cs, Rb and K. M(II) is at least one selected from the group consisting of Zr, Sn, V, Nb, Ta, Mo, W, Y, Fe, Co, Cr, Mn, Ni and Al. The respective subscripts in the composition formula are, $0 \leq a \leq 6$, $0 \leq b < 2$, $0 \leq c < 6$, $0 \leq d < 6$, and $-0.5 \leq o \leq 0.5$. Specific examples of the orthorhombic titanium-containing composite oxide include $Li_{2+a} Na_2 Ti_6 O_{14}$ ($0 \leq a \leq 6$).

The active material-containing layer may contain an active material other than the monoclinic titanium-containing oxide and the orthorhombic titanium-containing composite oxide. For example, the active material-containing layer may further contain particles of lithium titanate having a spinel crystal structure (for example, $Li_{4+x} Ti_5 O_{12}$ ($0 \leq x \leq 3$)). The mass of the active material other than the monoclinic titanium-containing oxide and the orthorhombic titanium-containing composite oxide in the active material-containing layer is preferably from 0% by mass to 10% by mass. It is more preferable that the active material-containing layer does not contain an active material other than the monoclinic titanium-containing oxide and the orthorhombic titanium-containing composite oxide.

(2) First Electro-Conductive Agent

Examples of the first electro-conductive agent include carbon nanotubes (CNTs) and carbon nanofibers (CNFs). Thus, the first electro-conductive agent may include, for example, at least one selected from the group consisting of carbon nanotubes and carbon nanofibers. Examples of the carbon nanofibers include high-purity vapor-grown carbon fibers grown by a vapor phase method.

(3) Second Electro-Conductive Agent

Examples of the second electro-conductive agent include carbon blacks (such as acetylene black and ketjen black), graphite, graphene, and hard carbons. Thus, the second electro-conductive agent may include, for example, at least one selected from the group consisting of carbon blacks, graphite, graphene, and hard carbons.

(4) Binder

As the binder, for example, a water-soluble binder may be used. Examples of the water-soluble binder include styrene butadiene rubber, acrylic acid and salts of acrylic acid (e.g., Na salt), and carboxymethyl cellulose and salts of carboxymethyl cellulose (e.g., Na salt).

Alternatively, a binder dissolvable in an organic solvent such as N-methyl pyrrolidone (NMP) may also be used. Examples of such a binder include polyvinylidene fluoride (PVdF), acrylic acid, polyimide, and polyamideimide.

(5) Current Collector

The current collector is preferably formed from an aluminum foil, or an aluminum alloy foil containing one or more elements selected from the group consisting of Mg, Ti, Zn, Fe, Cu, and Si. The thickness of the current collector is preferably from 10 μm to 20 μm, and more preferably from 12 μm to 17 μm.

[Production Method]

The electrode according to the first embodiment can be produced, for example, by the following procedure. First, active material particles, first electro-conductive agent, second electro-conductive agent, and binder are prepared. The prepared materials are suspended in a solvent capable of dissolving the binder, thereby preparing a slurry. Next, the slurry is applied onto one or both surfaces of the current collector, and the coating film is dried. Then, the dried coating film is pressed to obtain an electrode including an active material-containing layer.

By taking care so as not to apply an excessive shearing force to the object being treated when the slurry is prepared, it is possible to prepare a slurry containing the first electro-conductive agent while the maximum length of the first electro-conductive agent as a material is maintained. On the other hand, if an excessive physical impact is applied to the object being treated using a ball mill apparatus, for example, the fibrous first electro-conductive agent may be broken, and the maximum length B of the first electro-conductive agent may be shortened.

In addition, when the dried coating film is pressed, if an excessive linear load is applied, the first electro-conductive agent may become broken, and it is therefore preferable that care be taken.

Next, an example of the electrode according to the first embodiment will be described in a more concrete manner with reference to the drawings.

Figure 2:
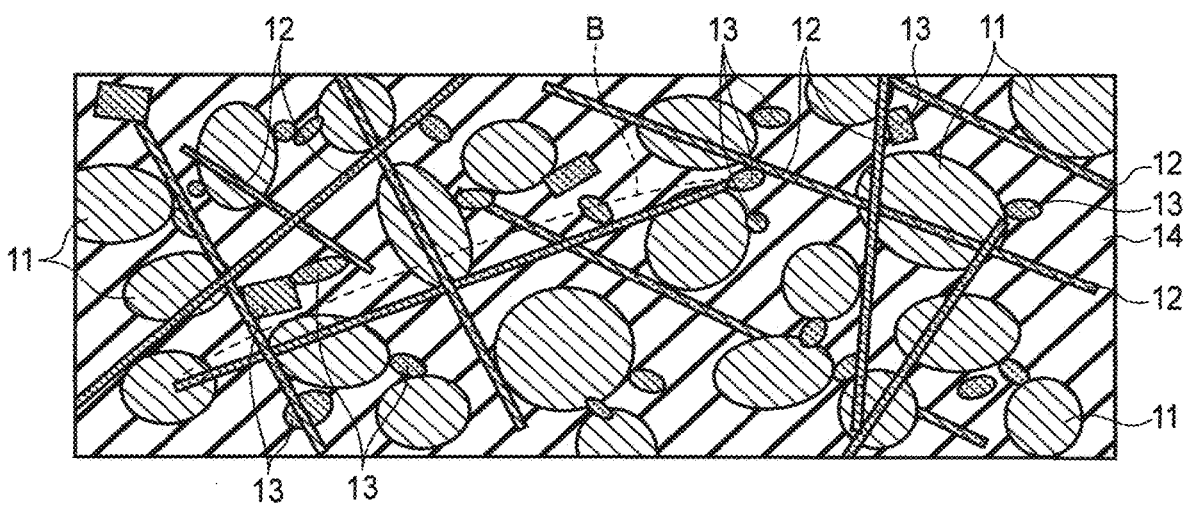
FIG. 2 is an enlarged view of portion II of the electrode according to FIG. 1.

FIG. 1 is a schematic cross-sectional view of an example of the electrode according to the embodiment. FIG. 2 is an enlarged view of portion II of the electrode of FIG. 1.

An electrode 1 illustrated in FIGS. 1 and 2 includes a current collector 1a, and active material-containing layers 1b formed on both surfaces of the current collector 1a.

As shown in FIG. 1, one of the active material-containing layers 1b has a thickness A [μm]. As shown in FIG. 2, the active material-containing layer 1b includes active material particles 11, first electro-conductive agents 12, second electro-conductive agents 13, and a binder 14.

The active material particles 11 include at least one compound selected from the group consisting of a monoclinic titanium-containing oxide and an orthorhombic titanium-containing composite oxide.

As shown in FIG. 2, the first electro-conductive agents 12 are fibrous. In the schematic view of FIG. 2, the maximum length of the first electro-conductive agents 12 is B [μm]. Each first electro-conductive agent 12 is in contact with plural active material particles 11.

As shown in FIG. 2, the second electro-conductive agents 13 have shapes other than a fibrous shape, for example, a flake shape, a scale shape, or a granular shape. The second electro-conductive agents 13 are disposed, for example, around the active material particles 11, between active material particles 11, and between first electro-conductive agents 12.

The active material-containing layer 1b satisfies formula (1): 0.6≤B/A≤1.5. Thus, even when the active material particles 11 undergoes volume change due to, for example, insertion and/or extraction of Li, each of the first electro-conductive agents 12 can maintain a state of being in contact with the plural active material particles. In addition, even when the first electro-conductive agents 12 move due to a volume change of the active material particles 11, the second electro-conductive agent can help maintain the conductive paths between the first electro-conductive agents 12.

Although not shown, the other active material-containing layer 1b also contains the active material particles, the first electro-conductive agents, the second electro-conductive agents, and the binder, and satisfies formula (1): 0.6≤B/A≤1.5.

Note that FIG. 2 schematically shows the active material particles 11, the first electro-conductive agents 12, and the second electro-conductive agents. Thus, it should be noted that the shapes and relative sizes of these components shown in FIG. 2 may differ from those of components in an actual electrode. In FIG. 2, the first electro-conductive agents 12 are depicted in a straight rod shape. However, since the first electro-conductive agents 12 are fibrous, they may, in reality, be curved, curled, or bent.

[Various Measurement Methods]
[Pretreatment]
First, an electrode to be measured is prepared. If the electrode to be measured is incorporated in a battery, the electrode to be measured is taken out by the following procedure. First, a battery including an electrode to be measured is prepared. The battery is discharged at a constant current in a thermostatic bath at 25° C. at a current value [A] corresponding to 0.2 C until the battery voltage reaches 1.5 V. Thereafter, the battery is discharged at a constant voltage of 1.5 V for 1 hour. After the constant-voltage discharge, the battery is placed in an argon glove box and disassembled. An electrode group is taken out from a container member in the glove box. Next, the electrode is taken out from the electrode group. At this time, an electrode connected to a negative electrode terminal of the battery can be determined as a negative electrode. Similarly, an electrode connected to a positive electrode terminal of the battery can be determined as a positive electrode. The taken-out electrode is immersed in ethyl methyl carbonate for 10 minutes. Next, the electrode is taken out from ethyl methyl carbonate and dried. In this manner, the electrode to be measured can be obtained.
[Cross-Sectional SEM Observation]
Cross-sectional polish is performed on the electrode to be measured, using an ion beam milling instrument. The obtained cross-section is observed with a scanning electron microscope equipped with an energy dispersive X-ray analyzer (SEM-EDX). Through this observation, shapes of components contained in the active material-containing layer and compositions of the components contained in the active material-containing layer (each element of B to U in the periodic table) can be known.

Average particle diameter C [μm] of the active material particles is measured as follows. First, the particle diameter of each active material particle is measured in one cross-sectional SEM image. In the measurement, the diameter of the smallest circle corresponding to each particle is defined as the particle diameter. Next, an average value of the obtained measurement results is calculated. The same operation is performed on ten images obtained by observing different portions of the active material-containing layer. The average values of the particle diameters in the ten images are further averaged, and the result is defined as an average particle diameter C [μm] of the active material particles.

Average dimension D [μm] of the second electro-conductive agent is measured as follows. First, a dimension of each second electro-conductive agent is measured in one cross-sectional SEM image. In the measurement, the diameter of the smallest circle corresponding to each second electro-conductive agent is defined as the dimension of each second electro-conductive agent. A value obtained by averaging the results is defined as dimension D of the second electro-conductive agent in the SEM image. The same operation is performed on ten images obtained by observing different portions of the active material-containing layer. The average values in the ten images are further averaged, and the result is defined as the average dimension D [μm] of the second electro-conductive agent.
[Identification of Active Material Particles]
The composition and crystal structure of the compound(s) contained in the active material particles can be identified by combining results of the elemental analysis by the SEM- EDX, results of an inductively coupled plasma (ICP) emission analysis described below, and results of a powder X-ray diffraction (XRD) analysis described below.

[Elemental Analysis by SEM-EDX]

According to the elemental analysis by SEM-EDX described above, the compositions of elements from B to U in the periodic table among elements contained in the active material particles can be known.

[Elemental Analysis by ICP]

A part of the electrode to be measured is put in a suitable solvent, and irradiated with an ultrasonic wave. For example, the electrode is put into ethyl methyl carbonate in a glass beaker, and by vibrating in an ultrasonic washing machine, an active material-containing layer including active material particles can be separated from a current collector. Next, the separated active material-containing layer is dried. The obtained active material-containing layer is ground in a mortar or the like to provide a powder including the target active material particles, electro-conductive agent, binder, and the like. By dissolving the powder in an acid, a liquid sample including the active material particles can be prepared. As the acid, hydrochloric acid, nitric acid, sulfuric acid, hydrogen fluoride, and the like may be used. By subjecting the liquid sample to ICP emission spectrometric analysis, concentration of metal elements (including Li) within the active material particles can be known.

[Identification of Composition of Compound Contained in Active Material Particles]

Based on the results of elemental analysis by SEM-EDX and the results of ICP emission spectrometry, the compositions of the compounds contained in the active material particles can be identified. If plural species of active materials are present, their mass ratio is estimated from the content ratio of elements unique to each active material. The ratio of the unique elements and active material mass can be determined from the composition of the constituent elements obtained by EDX.

[Identification of Crystal Structure]

The crystal structure of the compound(s) contained in the active material particles can be specified by X-ray diffraction (XRD) measurement.

The measurement is performed using CuKα ray as X-ray source in the measurement range where $2\theta=10°\text{-}90°$. By this measurement, the X-ray diffraction pattern of the compound (s) contained in the active material particles can be obtained.

SmartLab available from Rigaku is used as an apparatus for powder X-ray diffraction measurement. The measurement conditions are as follows: Cu target; 45 kV 200 mA; Soller slit: 5° for both light incidence and light reception; step width: 0.02 deg.; scan speed: 20 deg/min; semiconductor detector: D/teX Ultra 250; sample plate holder: flat plate glass sample plate holder (thickness of 0.5 mm); and measurement range: range of $10°\leq2\theta\leq90°$. In a case where another apparatus is used, measurement is performed using standard Si powder for powder X-ray diffraction, a condition where measurement results with the peak intensities, half-widths, and diffraction angles equivalent to results obtained by the above apparatus is found, and measurement is performed under that condition.

XRD measurement for the electrode can be performed by cutting out a sample having about the same area as a holder of the wide-angle X-ray diffraction apparatus from the electrode to be measured, and affixing the sample directly onto the glass holder, and measuring. Whereupon, XRD for the current collector is measured beforehand, to grasp the positions at which peaks derived from the current collector appear. In addition, whether peaks of mix materials such as the electro-conductive agent and binder are present is also grasped in advance. In a case where the peaks of the current collector and peaks of the active material overlap, it is desirable to perform measurement with the active material-containing layer separated from the current collector. This is in order to separate the overlapping peaks when quantitatively measuring the peak intensity. As a matter of course, this operation can be omitted if such peaks have been grasped in advance. The active material-containing layer may be physically separated, but can be easily separated by irradiation with an ultrasonic wave in a solvent. By measuring the active material-containing layer recovered in this manner, wide-angle X-ray diffraction measurement of the active material particles can be performed.

The XRD pattern of the compound (s) contained in the active material particles can be obtained by the above procedure. The crystal structure of the compound(s) contained in the active material particles can be identified from the obtained XRD pattern.

According to the first embodiment, the electrode is provided. The electrode includes the active material-containing layer. The active material-containing layer includes the active material particles, the fibrous first electro-conductive agent, and the second electro-conductive agent having a shape other than a fibrous shape. The active material particles include at least one compound selected from the group consisting of a monoclinic titanium-containing oxide and an orthorhombic titanium-containing composite oxide. The active material-containing layer satisfies formula (1): $0.6\leq B/A\leq1.5$. Thus, in this electrode, even when the volume change of the active material-containing layer takes place, electrical conductive paths between the active material particles can be maintained. As a result, the electrode according to the first embodiment can realize a battery capable of exhibiting an excellent cycle life.

Second Embodiment

According to a second embodiment, a battery is provided. The battery includes the electrode according to the first embodiment as a negative electrode, a positive electrode, and an electrolyte.

Since the battery according to the second embodiment includes the electrode according to the first embodiment, the battery can exhibit an excellent cycle life.

The battery according to the second embodiment can be repeatedly charged and discharged. Therefore, the battery according to the second embodiment can be referred to as a secondary battery.

The battery according to the second embodiment is, for example, a nonaqueous electrolyte battery. The nonaqueous electrolyte battery includes a nonaqueous electrolyte, and the nonaqueous electrolyte includes an electrolyte. Alternatively, the battery according to the second embodiment may be a battery containing an electrolytic solution containing an aqueous solvent and an electrolyte dissolved in the aqueous solvent.

Next, the battery according to a second embodiment will be described in more detail.

The battery according to the second embodiment includes the negative electrode, the positive electrode, and the electrolyte.

The negative electrode is the electrode according to the first embodiment. Hereinafter, the electrode according to the first embodiment, the current collector and the active material-containing layer included therein are referred to as a negative electrode, a negative electrode current collector and a negative electrode active material-containing layer, respectively. A compound that can be contained in the active material particles of the electrode according to the first embodiment is referred to as a negative electrode active material. The current collector tab that can be included in the electrode according to the first embodiment is referred to as a negative electrode tab.

The positive electrode can include, for example, a positive electrode current collector, and a positive electrode active material-containing layer formed on the positive electrode current collector.

The positive electrode current collector can have, for example, a band planar shape. The positive electrode current collector can have, for example, a first surface, and a second surface as a surface on a side opposite to the first surface. The positive electrode current collector may support the positive electrode active material-containing layer on only one surface thereof, or may support positive electrode active material-containing layers on both surfaces thereof. The positive electrode current collector may include a portion on which no positive electrode active material-containing layer is supported on the surface. This portion can serve as a positive electrode tab. Alternatively, the positive electrode may include a positive electrode tab that is a separate entity from the positive electrode current collector.

The positive electrode active material-containing layer may include a positive electrode active material. The positive electrode active material-containing layer may further include an electro-conductive agent and a binder, in addition to the positive electrode active material.

The positive electrode and the negative electrode can structure an electrode group. In the electrode group, the positive electrode active material-containing layer and the negative electrode active material-containing layer may face each other, for example, with a separator(s) interposed therebetween. The electrode group may have various structures. For example, the electrode group may have a stacked structure. The electrode group having the stacked structure can be obtained by stacking, for example, plural of positive electrodes and negative electrodes with the separator(s) sandwiched between the positive electrode active material-containing layer and the negative electrode active material-containing layer. Alternatively, the electrode group may have a wound structure, for example. The wound electrode group can be obtained, for example, by stacking a separator, a positive electrode, another separator, and a negative electrode, in this order, to form a stack, and winding the stack in such a manner that the negative electrode is positioned outside.

In a nonaqueous electrolyte battery, which is one example of the battery according to the second embodiment, the nonaqueous electrolyte may be held in the electrode group in a state of being impregnated therein, for example. Alternatively, in another example of the battery according to the second embodiment, the electrolytic solution including the electrolyte may be held in the electrode group in a state of being impregnated therein.

The battery according to the second embodiment may further include a negative electrode terminal and a positive electrode terminal. The negative electrode terminal can function as a conductor for electron transfer between the negative electrode and an external terminal, by having a part thereof being electrically connected to apart of the negative electrode. The negative electrode terminal may be connected to, for example, the negative electrode current collector, in particular, the negative electrode tab. Similarly, the positive electrode terminal may function as a conductor for electron transfer between the positive electrode and an external circuit, by having a part thereof being electrically connected to a part of the positive electrode. The positive electrode terminal may be connected to, for example, the positive electrode current collector, in particular, the positive electrode tab.

The battery according to the second embodiment may further include a container member. The container member can house the electrode group and the electrolyte. In the case of a nonaqueous electrolyte, the nonaqueous electrolyte may be impregnated into the electrode group, within the container member. A part of the positive electrode terminal and a part of the negative electrode terminal may extend out from the container member.

Next, each of the components that may be included in a nonaqueous electrolyte battery, which is one example of the battery according to the second embodiment, will be described in detail.

(Positive Electrode)

The positive electrode current collector is preferably an aluminum foil or aluminum alloy foil including one or more element selected from the group consisting of Mg, Ti, Zn, Mn, Fe, Cu, and Si.

The positive electrode active material may include, for example, at least one selected from the group consisting of manganese dioxide ($MnO_2$), iron oxide, copper oxide, nickel oxide, lithium nickel composite oxide (e.g., $Li_uNiO_2$), lithium cobalt composite oxide (e.g., $Li_uCoO_2$), lithium nickel cobalt composite oxide (e.g., $Li_uNi_{1-s}Co_sO_2$), lithium manganese cobalt composite oxide (e.g., $Li_uMn_sCo_{1-s}O_2$), lithium nickel cobalt manganese composite oxide (e.g., $Li_uNi_{1-s-t}Co_sMn_tO_2$), lithium nickel cobalt aluminum composite oxide (e.g., $Li_uNi_{1-s-t}Co_sAl_tO_2$), lithium manganese composite oxide (e.g., $Li_uMn_2O_4$ or $Li_uMnO_2$), lithium phosphorus oxide having an olivine structure (e.g., $Li_uFePO_4$, $Li_uMnPO_4$, $Li_uMn_{1-s}Fe_sPO_4$, $Li_uCoPO_4$), iron sulfate ($Fe_2(SO_4)_3$), and vanadium oxide (e.g., $V_2O_5$). In the above, it is preferable that $0<u≤1$, $0≤s≤1$, and $0≤t≤1$. These compounds can have Li inserted and extracted. As the positive electrode active material, one among the aforementioned compounds may be used alone, or a mixture of plural compounds may be used.

Since high input-output performance and life performance are more liable to be obtained, among them, it is preferable to include lithium manganese composite oxide having a spinel structure, lithium cobalt composite oxide ($Li_uCoO_2$), lithium nickel cobalt composite oxide ($Li_uNi_{1-s}Co_sO_2$), lithium manganese cobalt composite oxide ($Li_uMn_sCo_{1-s}O_2$), lithium nickel cobalt manganese composite oxide ($Li_uNi_{1-s-t}Co_sMn_tO_2$), or lithium phosphorus oxide having an olivine structure (e.g., $Li_uFePO_4$, $Li_uMnPO_4$, $Li_uMn_{1-s}Fe_sPO_4$, $Li_uCoPO_4$). In the above, it is preferable that $0<u≤1$, $0≤s≤1$, and $0≤t≤1$.

The electro-conductive agent that may be included in the positive electrode heightens current collecting performance and also can serve to suppress contact resistance between the active material and the current collector. Examples of the electro-conductive agent include carbonaceous materials such as carbon blacks (e.g., acetylene black), graphite, carbon nanofibers, and carbon nanotubes. As carbonaceous substance, one of these may be used alone, or alternatively, plural carbonaceous substances may be used.

The binder can serve to bind the active material, electro-conductive agent, and current collector. Examples of the binder include polytetrafluoroethylene (PTFE), polyvinylidene fluoride (PVdF), fluorine rubber, styrene butadiene rubber, acrylic resins or copolymers thereof, polyacrylic acid, polyacrylonitrile, and the like.

The positive electrode active material, electro-conductive agent, and binder in the positive electrode active material-containing layer are preferably blended at proportions of 80% by mass to 95% by mass, 3% by mass to 18% by mass, and 2% by mass to 17% by mass, respectively. By having the amount of electro-conductive agent be 3% or more by mass, the above-described effects can be demonstrated. By having the amount of electro-conductive agent be 18% or less by mass, decomposition of the nonaqueous electrolyte on the electro-conductive agent surface during storage at high temperature can be diminished. By having the amount of binder be 2% or more by mass, sufficient electrode strength can be obtained. By having the amount of binder be 17% or less by mass, the blending amount of the binder, which is an insulating material, within the positive electrode can be reduced, whereby internal resistance can be reduced.

The positive electrode can be produced, for example, by the following method. First, positive electrode active material, electro-conductive agent, and binder are suspended in solvent to prepare a slurry. The slurry is applied onto one surface or both of reverse surfaces of the positive electrode current collector, and the coating film is dried. Next, the dried coating film is subjected to pressing, whereby the positive electrode active material-containing layer can be obtained. Alternatively, the positive electrode may be produced by, forming the positive electrode active material-containing layer, electro-conductive agent, and binder in pellet form, and arranging the pellets onto the positive electrode current collector to be used as the positive electrode active material-containing layer.

(Nonaqueous Electrolyte)

As the nonaqueous electrolyte, for example, a liquid nonaqueous electrolyte or gel nonaqueous electrolyte may be used.

The liquid nonaqueous electrolyte can be prepared by dissolving an electrolyte in an organic solvent. The concentration of electrolyte is preferably from 0.5 mol/L to 2.5 mol/L. The gel nonaqueous electrolyte is prepared by obtaining a composite of the liquid electrolyte and a polymeric material.

Examples of the electrolyte include lithium salts such as lithium perchlorate ($LiClO_4$), lithium hexafluoro phosphate ($LiPF_6$), lithium tetrafluoro borate ($LiBF_4$), lithium hexafluoro arsenate ($LiAsF_6$), lithium trifluoromethane sulfonate ($LiCF_3SO_3$), and lithium bis trifluoromethyl sulfonyl imide [$LiN(CF_3SO_2)_2$]. As electrolyte, one among these electrolytes may be used alone, or two or more electrolytes may be used in combination. The electrolyte preferably includes $LiPF_6$.

Examples of the organic solvent include cyclic carbonates such as propylene carbonate (PC), ethylene carbonate (EC), or vinylene carbonate (VC); linear carbonates such as diethyl carbonate (DEC), dimethyl carbonate (DMC), or methyl ethyl carbonate (MEC); cyclic ethers such as tetrahydrofuran (THF), 2-methyl tetrahydrofuran (2-MeTHF), or dioxolane (DOX); linear ethers such as dimethoxy ethane (DME) or diethoxy ethane (DEE); acetonitrile (AN), and sulfolane (SL). As organic solvent, one among these solvents may be used alone, or two or more solvents may be used in combination.

Examples of more preferable organic solvents include mixed solvents where 2 or more selected from the group consisting of propylene carbonate (PC), ethylene carbonate (EC), diethyl carbonate (DEC), dimethyl carbonate (DMC), and methyl ethyl carbonate (MEC) are mixed. By using such a mixed solvent, a nonaqueous electrolyte battery excellent in charge-discharge cycle performance can be obtained. In addition, additives may be added to the electrolytic solution.

(Separator)

As the separator, there may be used, for example, a porous film, synthetic resin nonwoven, or the like formed from materials such as polyethylene, polypropylene, polyethylene terephthalate, cellulose, and polyvinylidene fluoride (PVdF). Moreover, there also may be used a separator having an inorganic compound applied onto a porous film.

(Container Member)

As the container member, for example, bag-form container made of a laminate film or a metal container may be used.

The shape thereof is not limited in particular, but examples include a flat form, an angular form, a cylinder form, a coin form, a button form, a sheet form, a stack form, and the like. Note, that as a matter of course, other than a small-sized battery for loading on mobile electronic devices and the like, a large-sized battery for loading onto two-wheeled or four-wheeled automobiles or the like is also viable.

As the laminate film, for example, there may be used a multilayer film where a metal layer is sandwiched between resin layers. Alternatively, there may also be used a multilayer film including a metal layer and resin layer(s) covering the metal layer.

The metal layer is preferably aluminum foil or aluminum alloy foil, in view of lightening weight. For the resin layer(s), for example, a polymeric material such as polypropylene (PP), polyethylene (PE), nylon, or polyethylene terephthalate (PET) may be used. The laminate film may be formed into the shape of a container member, by heat-sealing. A film thickness of the laminate film is preferably 0.2 mm or less.

The metal case may be made of, for example, aluminum or aluminum alloy. The aluminum alloy preferably contains elements such as magnesium, zinc, or silicon. On the other hand, if the aluminum alloy contains a transition metal such as iron, copper, nickel, or chromium, the content thereof is preferably 100 ppm or less. Thereby, long-term reliability under a high temperature environment and thermal radiation is capable of being dramatically improved. The wall thickness of the metal container is preferably 0.5 mm or less, and more preferably 0.2 mm or less.

(Positive Electrode Terminal)

The positive electrode terminal is made of, for example, a material that is electrically stable in the potential range of 3.0 V to 4.5 V (vs. Li/Li$^+$) relative to the redox potential of lithium, and has electrical conductivity. The positive electrode terminal is preferably made of aluminum or aluminum alloy containing element(s) such as Mg, Ti, Zn, Mn, Fe, Cu, and Si. The positive electrode terminal is preferably made of the same material as the positive electrode current collector, in order to reduce contact resistance with the positive electrode current collector.

(Negative Electrode Terminal)

The negative electrode terminal is made of, for example, a material that is electrically stable in the potential range of 0.8 V to 3.0 V (vs. Li/Li+) relative to the redox potential of lithium, and has electrical conductivity. The negative electrode terminal is preferably made of aluminum or aluminum alloy containing element(s) such as Mg, Ti, Zn, Mn, Fe, Cu, and Si. The negative electrode terminal is preferably made of the same material as the negative electrode current collector, in order to reduce contact resistance with the negative electrode current collector.

Next, few examples of the nonaqueous electrolyte battery according to the second embodiment will be specifically described with reference to the drawings.

Figure 3:
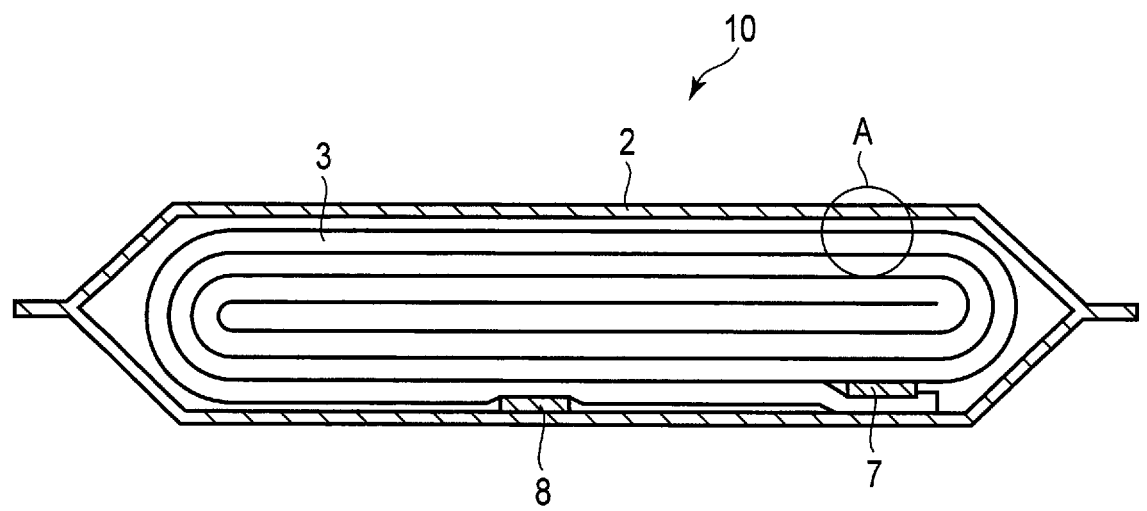
FIG. 3 is a schematic cross-sectional view of one example of a nonaqueous electrolyte battery according to an embodiment.
Figure 4:
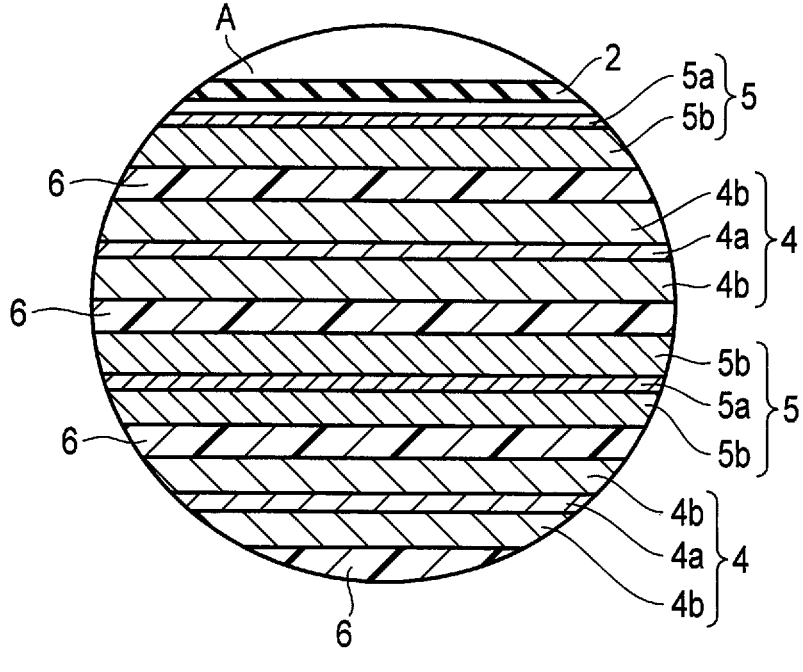
FIG. 4 is an enlarged cross-sectional view of portion A of FIG. 3.

FIG. 3 is a schematic cross-sectional view of an example of a flat nonaqueous electrolyte battery according to the second embodiment. FIG. 4 is an enlarged cross-sectional view of portion A in FIG. 3.

A nonaqueous electrolyte battery 10 shown in FIGS. 3 and 4 includes an electrode group 3 in a flat form shown in FIG. 3. The flat-formed electrode group 3 is housed in a bag-form container member 2 made of a laminate film. The laminate film includes a metal layer and two resin layers sandwiching the metal layer therebetween.

The wound electrode group 3 in flat form is formed by, spirally winding a stack where stacked, in order from the outside, are a negative electrode 5, a separator 6, a positive electrode 4, and a separator 6, as shown in FIG. 4, and then press-forming the wound stack. Of the negative electrode 5, the portion located outermost has a negative electrode active material-containing layer 5b formed on one face on the internal surface side of a negative electrode current collector 5a, as shown in FIG. 4. For the other portions of the negative electrode 5, negative electrode active material-containing layers 5b are formed on both of reverse surfaces of the negative electrode current collector 5a. For the positive electrode 4, positive electrode active material-containing layers 4b are formed on both of reverse surfaces of a positive electrode current collector 4a.

In vicinity of the outer peripheral edge of the wound electrode group 3, a negative electrode terminal 8 is connected to the negative electrode current collector 5a at the outermost portion of the negative electrode 5, and a positive electrode terminal 7 is connected to the positive electrode current collector 4a of the positive electrode 4 located on the inner side. The negative electrode terminal 8 and positive electrode terminal 7 are extended out from an opening of the bag-form container member 2.

The nonaqueous electrolyte battery 10 shown in FIGS. 3 and 4 further includes a nonaqueous electrolyte that is not depicted. The nonaqueous electrolyte is housed within the container member 2 in a state of being impregnated into the electrode group 3.

The nonaqueous electrolyte can be put in, for example, from the opening of the bag-form container member 2. After putting in the nonaqueous electrolyte, by heat-sealing the opening of the bag-form container member 2 with the negative electrode terminal 8 and positive electrode terminal 7 sandwiched therebetween, the wound electrode group 3 and nonaqueous electrolyte can be completely sealed in.

The negative electrode 5 shown in FIG. 4 is one example of the electrode according to the first embodiment.

Figure 5:
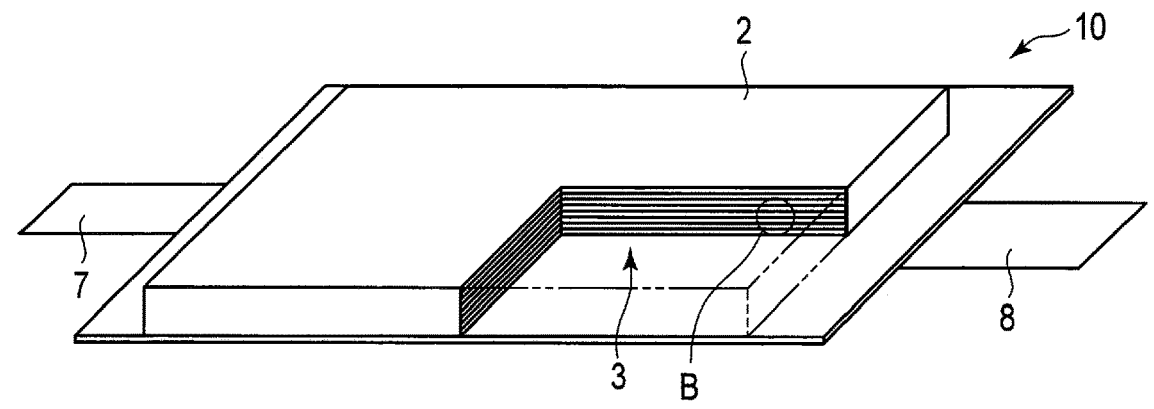
FIG. 5 is a schematic partially cutout perspective view of another example of the nonaqueous electrolyte battery according to the embodiment.
Figure 6:
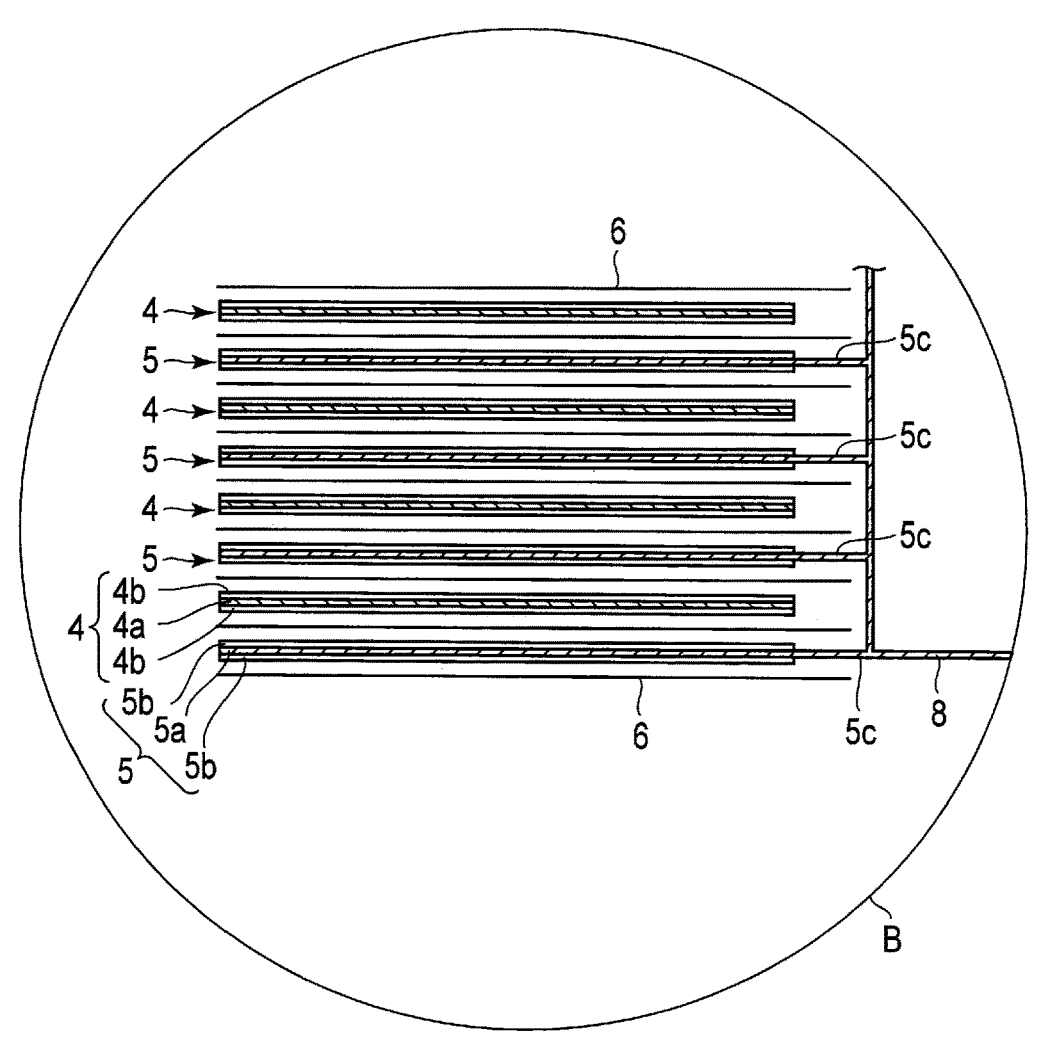
FIG. 6 is an enlarged cross-sectional view of portion B of FIG. 5.

The nonaqueous electrolyte battery according to the second embodiment is not limited to one having the configuration shown above in FIGS. 3 and 4, and may have, for example, a configuration shown in FIGS. 5 and 6.

FIG. 5 is a schematic partially cutout perspective view showing another example of the nonaqueous electrolyte battery according to the second embodiment. FIG. 6 is an enlarged cross-sectional view showing portion B in FIG. 5.

A nonaqueous electrolyte battery 10 shown in FIGS. 5 and 6 includes a stacked electrode group 3. The stacked electrode group 3 is housed in a container member 2 made of laminate film. The laminate film includes a metal layer and two resin layers having the metal layer sandwiched therebetween.

As shown in FIG. 6, the stacked electrode group 3 has a structure in which positive electrodes 4 and negative electrodes 5 are alternately stacked with separator(s) 6 interposed therebetween. Plural positive electrodes 4 are present, each of which includes a current collector 4a, and positive electrode active material-containing layers 4b supported on both of reverse surfaces of the current collector 4a. Plural negative electrodes 5 are present, each of which includes a negative electrode current collector 5a, and negative electrode active material-containing layers 5b supported on both of reverse surfaces of the negative electrode current collector 5a. An end of the negative electrode current collector 5a of each of the negative electrodes 5 protrudes beyond the positive electrodes 4. The portion 5c of the negative electrode current collector 5a protruding beyond the positive electrodes 4 is electrically connected to a strip-shaped negative electrode terminal 8. The tip of the strip-shaped negative electrode terminal 8 is extended out from the container member 2. Although not depicted, for the positive electrode current collectors 4a of the positive electrodes 4, ends positioned on the opposite side relatives to the protruded ends 5c of the negative electrode current collectors 5a protrude beyond the negative electrodes 5. The portions of the positive electrode current collectors 4a protruding beyond the negative electrodes 5 is electrically connected to a strip-shaped positive electrode terminal 7. The tip of the strip-shaped positive electrode terminal 7 is positioned on the opposite side from the negative electrode terminal 8, and extended out from a side of the container member 2.

The negative electrode 5 shown in FIG. 6 is one example of the electrode according to the first embodiment.

The battery according to the second embodiment includes the electrode according to the first embodiment, and can therefore exhibit excellent cycle life.

Third Embodiment

According to a third embodiment, a battery pack is provided. This battery pack includes the battery according to the second embodiment.

The battery pack according to the third embodiment may include plural batteries. The plural batteries may be electrically connected in series or electrically connected in parallel. Alternatively, plural batteries may be connected in a combination of in-series and in-parallel.

For example, the battery pack according to the third embodiment may be provided with plural batteries according to the second embodiment. These batteries may be connected in series. Further, the batteries connected in series may structure a battery module. Namely, the battery pack according to the third embodiment may also include a battery module.

The battery pack according to the third embodiment may include plural battery modules. The plural battery modules may be connected in series, in parallel, or in combination of in-series and in-parallel.

An example of a battery pack according to the third embodiment will be described in detail with reference to FIGS. 7 and 8. As single-batteries, the flat battery shown in FIG. 3 and FIG. 4 may be used.

The plural single-batteries 21, each of which are configured from the flat nonaqueous electrolyte battery shown in the aforementioned FIG. 3 and FIG. 4, are stacked so that externally extending negative electrode terminals 8 and positive electrode terminals 7 are aligned in the same direction, and are fastened with adhesive tape(s) 22 to structure a battery module 23. These single-batteries 21 are electrically connected in series to each other as shown in FIG. 8.

A printed wiring board 24 is disposed facing the single-battery 21 side surface from which the negative electrode terminals 7 and the positive electrode terminals 8 extend. As shown in FIG. 8, the printed wiring board 24 is mounted with a thermistor 25, a protective circuit 26, and an energizing terminal 27 to external equipment. Note that an insulating plate (not shown) is attached to the printed wiring board 24 on the surface facing the battery module 23 so as to avoid unnecessary connection with the wiring of the battery module 23.

A positive electrode side lead 28 is connected to the positive electrode terminal 7 located lowermost in the battery module 23, and a distal end thereof is inserted into a positive electrode side connector 29 of the printed wiring board 24 and electrically connected thereto. A negative electrode side lead 30 is connected to the negative electrode terminal 8 located uppermost in the battery module 23, and a distal end thereof is inserted into the negative electrode side connector 31 of the printed wiring board 24 and electrically connected thereto. These connectors 29 and 31 are connected to the protective circuit 26 through wiring 32 and wiring 33 formed on the printed wiring board 24.

The thermistor 25 detects the temperature of the single-batteries 21, and the detection signal is transmitted to the protective circuit 26. Under a predetermined condition, the protective circuit 26 can shut off a plus-side wiring 34a and a minus-side wiring 34b between the protective circuit 26 and the energizing terminal 27 to external equipment. A predetermined condition is, for example, when the temperature detected by the thermistor 25 becomes a predetermined temperature or higher. The predetermined condition may also be when overcharge, over-discharge, overcurrent, or the like of the single-battery 21 is detected. Detection of this overcharge or the like is performed for each of the individual single-batteries 21 or the entire battery module 23. In the case of detecting each single-battery 21, a battery voltage may be detected, or a positive electrode potential or a negative electrode potential may be detected. In the latter case, a lithium electrode used as a reference electrode is inserted into each single-battery 21. In the case of FIG. 7 and FIG. 8, wiring 35 for voltage detection is connected to each of the single-batteries 21, and detection signals are transmitted to the protective circuit 26 through the wiring 35.

Protective sheets 36 made of rubber or resin are respectively arranged on three side surfaces of the battery module 23 excluding the side surface from which the positive electrode terminal 7 and the negative electrode terminal 8 protrude.

The battery module 23 is housed in a housing container 37 together with each protective sheet 36 and the printed wiring board 24. That is, the protective sheets 36 are disposed in the housing container 37 respectively on both inner side surfaces in a long-side direction and an inner side surface in a short-side direction, and the printed wiring board 24 is disposed on the inner side surface at the opposite side in the short-side direction. The battery module 23 is located in a space surrounded by the protective sheets 36 and the printed wiring board 24. A lid 38 is attached to the upper surface of the housing container 37.

For fixing the battery module 23, a thermal shrinkage tape may be used in place of an adhesive tape 22. In this case, after the protective sheets are disposed on each side surface of the battery module and a thermal shrinkage tape is wound, the thermal shrinkage tape is thermally shrunk, to bind the battery module.

Figure 8:
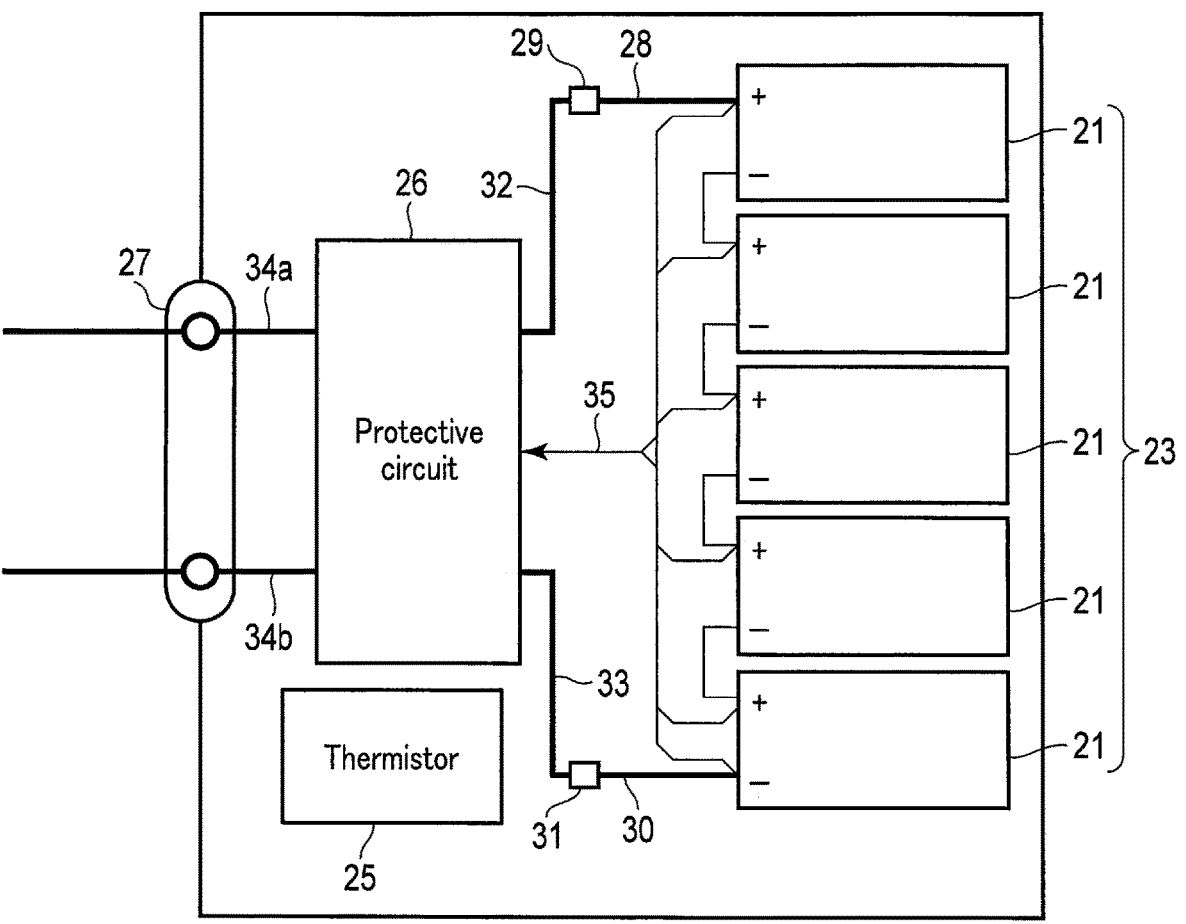
FIG. 8 is a block diagram showing an electric circuit of the battery pack shown in FIG. 7.

In FIGS. 7 and 8, shown is a form where the single-batteries 21 are connected in series, but the single-batteries 21 may be connected in parallel in order to increase the battery capacity. Assembled battery packs 20 may also be connected in series and/or parallel.

Moreover, the mode of the battery pack according to the third embodiment is appropriately changed depending on the application. The battery pack according to the third embodiment is favorably used in an application where excellent cycle performance is demanded when large current is taken out. Specifically, the battery pack is used as a power source of a digital camera, or an onboard battery for vehicles such as a train, a two-wheeled to four-wheeled hybrid electric automobile, a two-wheeled to four-wheeled electric automobile, and a power-assisted bicycle. In particular, the battery pack is favorably used as an onboard battery.

Since the battery pack according to the third embodiment includes the battery according to the second embodiment, the battery pack can exhibit excellent cycle life.

EXAMPLES

Hereinafter, examples will be explained, but so long as the spirit of the present invention is not departed, the present invention is not limited to the examples demonstrated below.

Example 1

In Example 1, an electrode of Example 1 was produced by the following procedures.

First, secondary particles of monoclinic niobium-titanium composite oxide $TiNb_2O_7$ were prepared. Carbon was attached onto the surface of the secondary particles. In this manner, active material particles were obtained. The average primary particle diameter of the active material particles was 1 μm, while the average secondary particle diameter was 10 μm. The average particle diameter of the active material particle (without distinguishing between primary particles and secondary particles) was 10 μm. The BET specific surface by $N_2$ adsorption of the carbon-coated active material particles was 10 $m^2/g$.

Next, fibrous carbon nanofibers having an average fiber diameter of 100 nm and an average fiber length of 30 μm were prepared as a first electro-conductive agent. Acetylene black having an average size of 1 m was prepared as a second electro-conductive agent. Further, polyvinylidene fluoride (PVdF) was prepared as a binder. Next, the active material particles, the first electro-conductive agent, the second electro-conductive agent, and the binder were mixed at a mass ratio of 90:2:4:4 to obtain a mixture. This mixture was dispersed in an n-methyl pyrrolidone (NMP) solvent to prepare a slurry. The slurry was produced by stirring with a high-speed stirrer so as to reduce physical impact on the particles during its preparation.

The obtained slurry was applied onto one surface of a current collector of an aluminum foil having a thickness of 15 μm, and the coating film was dried. Next, the slurry was applied onto the other surface of the current collector, and the coating film was dried. Thereafter, the dried coating film was subjected to roll pressing. At this time, care was taken so as not to apply an excessive linear load to the coating film. Thus, an electrode including the current collector and the active material-containing layers formed on both surfaces of the current collector was obtained. Thereafter, the electrode was cut into a predetermined size. The thicknesses A of each active material-containing layer formed on the surfaces of the current collector was set to 40 μm.

Examples 2 to 19 and Comparative Examples 1 and 2

In Examples 2 to 14, each electrode was produced by the same procedure as in Example 1 except that the active material particles, the first electro-conductive agent, and/or the second electro-conductive agent were changed to those shown in Tables 1 and 2 below. In Table 2, regarding the first electro-conductive agent, the second electro-conductive agent, and the binder of each example for which the same as those in Example 1 were used are described as "Example 1".

In each of Examples 7 to 9, the thickness A of each active material-containing layer formed on the surfaces of the current collector was set to 25 μm. In Example 13, the thickness A of each active material-containing layer formed on the surfaces of the current collector was set to 90 μm. In Example 14, the thickness A of each active material-containing layer formed on the surfaces of the current collector was set to 38 μm. In Comparative Example 2, the thickness A of each active material-containing layer formed on the surfaces of the current collector was set to 30 μm.

Comparative Example 3

In Comparative Example 3, an electrode was produced following the same procedure as in Example 1 except for the following points.

First, in Comparative Example 3, secondary particles of monoclinic niobium-titanium composite oxide $TiNb_2O_7$ having an average primary diameter of 1 μm were prepared as active material particles. The BET specific surface by $N_2$ adsorption of the primary particles was 10 $m^2/g$.

In Comparative Example 3, the slurry was prepared using a planetary mixer and a ball mill apparatus. After the slurry dispersibility was increased with the planetary mixer, the slurry was dispersed with the ball mill apparatus, thereby producing the slurry.

Comparative Example 4

In Comparative Example 4, an electrode was produced following the same procedure as in Comparative Example 3 except that carbon nanofibers having an average fiber diameter of 100 nm and an average fiber length of 60 μm were used as the first electro-conductive agent, and the thickness A of each active material-containing layer formed on the surfaces of the current collector was set to 38 μm.

Examples 20 to 27 and Comparative Examples 5 to 10

In Examples 20 to 27 and Comparative Examples 5 to 10, each electrode was produced following the same procedure as in Example 1 except that the active material particles were changed to those shown in Table 1 below, or that the active material particles and the second electro-conductive agent were changed to those shown in Tables 1 and 2 below. In Table 2, regarding the first electro-conductive agent, the second electro-conductive agent, and the binder of each example for which the same as those in Example 1 were used are described as "Example 1".

In Comparative Example 6, the thicknesses A of each active material-containing layer formed on the surfaces of the current collector was set to 38 μm. In Comparative Example 8, the thicknesses A of each active material-containing layer formed on the surfaces of the current collector was set to 30 μm.

TABLE 1

| | | | Active Material Particles | | | |
|---|---|---|---|---|---|---|
| | Composition | Form | Average Primary Particle Diameter [μm] | Average Secondary Particle Diameter [μm] | Average Particle Diameter [μm] | BET Specific Surface Area [$m^2/g$] |
| Example 1 | $TiNb_2O_7$ | Secondary particles; Carbon-coated | 1 | 10 | 10 | 10 |
| Example 5 | $TiNb_2O_7$ | Secondary particles; Carbon-coated | 1 | 7 | 7 | 12 |
| Example 6 | $TiNb_2O_7$ | Secondary particles; Carbon-coated | 1 | 20 | 20 | 7 |
| Example 15 | $TiNb_2O_7$ | Primary particles | 1 | — | 1 | 10 |
| Example 16 | $TiNb_2O_7$ | Primary particles | 0.8 | — | 0.8 | 11 |
| Example 17 | $TiNb_2O_7$ | Secondary particles | 0.8 | 12 | 12 | 9 |
| Comparative Example 3 | $TiNb_2O_7$ | Primary particles | 1 | — | 1 | 10 |
| Example 20 | $Li_2Na_{1.6}Ti_{5.6}Nb_{0.4}O_{14}$ | Secondary particles; Carbon-coated | 1 | 10 | 10 | 10 |
| Example 21 | $Li_2Na_{1.6}Ti_{5.6}Nb_{0.4}O_{14}$ | Primary particles | 1 | — | 1 | 11 |
| Example 24 | $TiO_2$ (B) | Secondary particles; Carbon-coated | 1 | 10 | 10 | 10 |
| Example 25 | $TiO_2$ (B) | Primary particles | 1 | — | 1 | 11 |
| Comparative Example 5 | $Li_4Ti_5O_{12}$ | Primary particles | 1 | — | 1 | 10 |

*For Examples 2 to 4, Examples 7 to 14, and Comparative Examples 1 and 2, the same active material particles as that of Example 1 were used.
*For Examples 18 and 19, the same active material particles as that of Example 15 were used.
*For Comparative Example 4, the same active material particles as that of Comparative Example 3 were used.
*For Examples 22 and 23, as well as Comparative Example 9, the same active material particles as that of Example 21 were used.
*For Examples 26 and 27, as well as Comparative Example 10, the same active material particles as that of Example 25 were used.
*For Comparative Examples 6 to 8, the same active material particles as Comparative Example 5 were used.

TABLE 2

| | First Electro-conductive Agent | | | Second Electro-conductive Agent | | |
| --- | --- | --- | --- | --- | --- | --- |
| | Material | Average Fiber Length [μm] | Average Fiber Diameter [nm] | Material | Average Dimension [μm] | Binder |
| Example 1 | Carbon nanofibers | 30 | 100 | Acetylene black | 1 | PVdF |
| Example 2 | Carbon nanofibers | 45 | 100 | Example 1 | | Example 1 |
| Example 3 | Carbon nanofibers | 25 | 100 | Example 1 | | Example 1 |
| Example 4 | Carbon nanofibers | 60 | 100 | Example 1 | | Example 1 |
| Example 7 | Carbon nanofibers | 20 | 100 | Example 1 | | Example 1 |
| Example 8 | Carbon nanofibers | 20 | 150 | Example 1 | | Example 1 |
| Example 9 | Carbon nanofibers | 20 | 300 | Example 1 | | Example 1 |
| Example 10 | | Example 1 | | graphite | 6 | Example 1 |
| Example 11 | | Example 1 | | graphene | 1 | Example 1 |
| Example 12 | | Example 1 | | Ketjen black | 0.5 | Example 1 |
| Example 13 | Carbon nanofibers | 60 | 100 | Example 1 | | Example 1 |
| Example 14 | Carbon nanofibers | 60 | 100 | Example 1 | | Example 1 |
| Example 18 | | Example 1 | | graphite | 6 | Example 1 |
| Example 19 | | Example 1 | | graphene | 1 | Example 1 |
| Comparative Example 1 | Carbon nanofibers | 20 | 150 | Example 1 | | Example 1 |
| Comparative Example 2 | Carbon nanofibers | 60 | 100 | Example 1 | | Example 1 |
| Comparative Example 4 | Carbon nanofibers | 60 | 100 | Example 1 | | Example 1 |
| Example 22 | | Example 1 | | graphite | 6 | Example 1 |
| Example 23 | | Example 1 | | graphene | 1 | Example 1 |
| Example 26 | | Example 1 | | graphite | 6 | Example 1 |
| Example 27 | | Example 1 | | graphene | 1 | Example 1 |
| Comparative Example 6 | Carbon nanofibers | 60 | 100 | Example 1 | | Example 1 |
| Comparative Example 7 | Carbon nanofibers | 20 | 150 | Example 1 | | Example 1 |
| Comparative Example 8 | Carbon nanofibers | 60 | 100 | Example 1 | | Example 1 |
| Comparative Example 9 | Carbon nanofibers | 20 | 150 | Example 1 | | Example 1 |
| Comparative Example 10 | Carbon nanofibers | 20 | 150 | Example 1 | | Example 1 |

* For Examples 5 and 6, 15 to 17, 20, 21, 24, 25, Comparative Examples 3 and 5, the same first electro-conductive agent, second electro-conductive agent, and binder as that of Example 1 were respectively used.

Example 28

In Example 28, an electrode was produced following the same procedure as in Example 1, except for the following points. In this example, as the binder, carboxymethyl cellulose (CMC) and styrene-butadiene rubber (SBR) were prepared. Note, that in this example, the same active material particles, first electro-conductive agent, and second electro-conductive agent as those used in Example 1 were used. The active material particles, the first electro-conductive agent, the second electro-conductive agent, CMC, and SBR were mixed at a mass ratio of 90:2:4:2:2 to obtain a mixture. This mixture was dispersed in water to prepare a slurry. The same stirring apparatus as used in Example 1 was used.

Example 29

In Example 29, an electrode was produced following the same procedure as in Example 14, except for the following points. In this example, as the binder, carboxymethyl cellulose (CMC) and styrene-butadiene rubber (SBR) were prepared. Note, that in this example, the same active material particles, first electro-conductive agent, and second electro-conductive agent as those used in Example 1 were used. The active material particles, the first electro-conductive agent, the second electro-conductive agent, CMC, and SBR were mixed at a mass ratio of 90:2:4:2:2 to obtain a mixture. This mixture was dispersed in water to prepare a slurry. The same stirring apparatus as used in Example 1 was used.

Comparative Example 11

In Comparative Example 11, an electrode was produced following the same procedure as in Comparative Example 1, except for the following points. In this example, as the binder, carboxymethyl cellulose (CMC) and styrene-butadiene rubber (SBR) were prepared. Note, that in this example, the same active material particles, first electro-conductive agent, and second electro-conductive agent as those used in Comparative Example 3 were used. The active material particles, the first electro-conductive agent, the second electro-conductive agent, CMC, and SBR were mixed at a mass ratio of 90:2:4:2:2 to obtain a mixture. This mixture was dispersed in water to prepare a slurry. The same stirring apparatus as used in Comparative Example 1 was used.

[Production of Nonaqueous Electrolyte Battery]

Examples 1 to 6, 10 to 12, 15 to 19, 28, and 29, and Comparative Examples 1, 3 and 11

By the procedures set forth below, using, as a negative electrode, each of the electrodes of Examples 1 to 6, 10 to 12, 15 to 19, 28, and 29, and Comparative Examples 1, 3, and 11, a nonaqueous electrolyte battery of each example was produced. Hereinafter, the electrode of each example is simply referred to as "negative electrode".

<Production of Positive Electrode>

Particles of lithium nickel cobalt manganese composite oxide $LiNi_{0.33}Co_{0.33}Mn_{0.33}O_2$ as a positive electrode active material, carbon blacks as an electro-conductive agent, and polyvinylidene fluoride (PVdF) as a binder were prepared. The prepared materials were mixed at a mass ratio of 90:5:5 to obtain a mixture. Next, the obtained mixture was dispersed in an n-methyl pyrrolidone (NMP) solvent to prepare a positive electrode slurry. This slurry was applied onto both surfaces of an aluminum foil having a thickness of 15 μm, and the coating film was dried. Thereafter, the dried coating film was subjected to roll pressing. In this manner, a positive electrode including the positive electrode current collector and positive electrode active material-containing layers formed on both surfaces of the positive electrode current collector was obtained. Thereafter, the positive electrode was cut into a predetermined size to obtain a positive electrode. The thickness of each positive electrode active material-containing layer formed on the surfaces of the positive electrode current collector was 46 μm.

<Assembly of Nonaqueous Electrolyte Battery>

Two separators of cellulose fiber nonwoven fabric having a thickness of 20 μm were prepared. Next, the negative electrode, the separator, the positive electrode, and the separator were stacked in this order to obtain a stack. Next, the stack was spirally wound so that part of the negative electrode was positioned on the outermost side to obtain a wound body. Next, the wound body was pressed. In this manner, an electrode group was produced. The electrode group was inserted into a container of a metallic can made of an aluminum alloy (Al 99% purity) having a wall thickness of 0.25 mm.

On the other hand, a nonaqueous electrolyte was prepared by the following procedure. First, propylene carbonate (PC) and diethyl carbonate (DEC) were mixed at a volume ratio of PC:DEC of 1:2 to obtain a mixed solvent. Lithium hexafluoro phosphate $LiPF_6$ was dissolved in the mixed solvent at a concentration of 1 M to obtain a liquid nonaqueous electrolyte.

The prepared liquid nonaqueous electrolyte was put into the container. In this manner, the electrode group held the nonaqueous electrolyte. Then, the container was sealed to obtain an angular nonaqueous electrolyte battery having a thickness of 21 mm, a width of 115 mm, and a height of 105 mm.

Examples 7 to 9, 13 and 14, and Comparative Examples 2 and 4

In Example 7, a nonaqueous electrolyte battery was produced following the same procedure as in Example 1, except that the electrode of Example 7 was used as a negative electrode, and that the thickness of each positive electrode active material-containing layer formed on the surfaces of the positive electrode current collector was set to 30 μm.

In Examples 8 and 9, nonaqueous electrolyte batteries were produced following the same procedure as in Example 7, except that each of the electrodes of Examples 8 and 9 were used as negative electrodes.

In Example 13, a nonaqueous electrolyte battery was produced following the same procedure as in Example 1, except that the electrode of Example 13 was used as negative electrode, and that the thickness of each positive electrode active material-containing layer formed on the surfaces of the positive electrode current collector was set to 100 μm.

In Example 14, a nonaqueous electrolyte battery was produced following the same procedure as in Example 1, except that the electrode of Example 14 was used as negative electrode, and that the thickness of each positive electrode active material-containing layer formed on the surfaces of the positive electrode current collector was set to 44 μm.

In Comparative Example 2, a nonaqueous electrolyte battery was produced following the same procedure as in Example 1, except that the electrode of Comparative Example 2 was used as negative electrode, and that the thickness of each positive electrode active material-containing layer formed on the surfaces of the positive electrode current collector was set to 35 μm.

In Comparative Example 4, a nonaqueous electrolyte battery was produced following the same procedure as in Example 1, except that the electrode of Comparative Example 4 was used as negative electrode, and that the thickness of each positive electrode active material-containing layer formed on the surfaces of the positive electrode current collector was set to 44 μm.

Examples 20 to 23 and Comparative Example 9

In Example 20, a nonaqueous electrolyte battery was produced following the same procedure as in Example 1, except that the electrode of Example 20 was used as negative electrode, and that the thickness of each positive electrode active material-containing layer formed on the surfaces of the positive electrode current collector was set to 25 μm.

In each of Examples 21 to 23 and Comparative Example 9, a nonaqueous electrolyte battery was produced following the same procedure as in Example 20, except that the electrode of each example were used as negative electrode.

Examples 24 to 27 and Comparative Example 10

In Example 24, a nonaqueous electrolyte battery was produced following the same procedure as in Example 1, except that the electrode of Example 24 was used as negative electrode, and that the thickness of each positive electrode active material-containing layer formed on the surfaces of the positive electrode current collector was set to 40 μm.

In each of Examples 25 to 27 and Comparative Example 10, a nonaqueous electrolyte battery was produced following the same procedure as in Example 24, except that the electrode of each example were used as negative electrode.

Comparative Examples 5 to 8

In Comparative Example 5, a nonaqueous electrolyte battery was produced following the same procedure as in Example 1, except that the electrode of Comparative Example 5 was used as negative electrode, and that the thickness of each positive electrode active material-containing layer formed on the surfaces of the positive electrode current collector was set to 30 μm.

In Comparative Example 6, a nonaqueous electrolyte battery was produced following the same procedure as in Comparative Example 5, except that the electrode of Comparative Example 6 was used as negative electrode, and that the thickness of each positive electrode active material-containing layer formed on the surfaces of the positive electrode current collector was set to 29 μm.

In Comparative Example 7, a nonaqueous electrolyte battery was produced following the same procedure as in Comparative Example 5, except that the electrode of Comparative Example 7 was used as negative electrode.

In Comparative Example 8, a nonaqueous electrolyte battery was produced following the same procedure as in Comparative Example 5, except that the electrode of Comparative Example 8 was used as negative electrode, and that the thickness of each positive electrode active material-containing layer formed on the surfaces of the positive electrode current collector was set to 23 μm.

[Cycle Life Test]

The nonaqueous electrolyte battery of each example was subjected to a cycle life test under the following conditions.

In the following description, the nonaqueous electrolyte battery of each example is simply referred to as a "battery".

In this test, the battery was subjected to a charge-discharge cycle test under a 45° C. environment. Charging was performed in a constant-current-constant voltage mode. The charging conditions of each cycle were set such that the charging rate was 2 C and the charging voltage was 3.2 V. Charging was stopped either after 1 hour had elapsed or when the current value reached 0.05 C even if 1 hour had not elapsed. Discharging was performed in a constant current mode of 2 C. A ratio C2/C1 of discharge capacity C2 after 1000 cycles to discharge capacity C1 at the first cycle was defined as a capacity retention ratio [%] after 1000 cycles.

[Cross-Sectional Observation]

The cross section of the electrode of each example was analyzed by the procedure described above. The results are shown in Table 3 below. Among the carbon-containing components, a component having an aspect ratio of 20 or more was determined as a fibrous first electro-conductive agent, while a component having an aspect ratio of less than 20 was determined as a second electro-conductive agent. For example, the second electro-conductive agent described as "chained" in Table 3 below was different in shape from the first electro-conductive agent, which was fibrous, in terms of aspect ratio.

TABLE 3

| | Thickness A of Active Material-Containing Layer [μm] | Maximum Length B of First Electro-conductive Agent [μm] | Average Particle Diameter C of Active Material Particle [μm] | Average Dimension D of Second Electro-conductive Agent [μm] | Shape of Second Electro-conductive Agent |
|---|---|---|---|---|---|
| Example 1 | 40 | 28 | 10 | 1 | chained |
| Example 2 | 40 | 41 | 10 | 1 | chained |
| Example 3 | 40 | 24 | 10 | 1 | chained |
| Example 4 | 40 | 56 | 10 | 1 | chained |
| Example 5 | 40 | 28 | 7 | 1 | chained |
| Example 6 | 40 | 28 | 20 | 1 | chained |
| Example 7 | 25 | 15 | 10 | 1 | chained |
| Example 8 | 25 | 15 | 10 | 1 | chained |
| Example 9 | 25 | 15 | 10 | 1 | chained |
| Example 10 | 40 | 28 | 10 | 6 | plate |
| Example 11 | 40 | 28 | 10 | 1 | sheet |
| Example 12 | 40 | 28 | 10 | 0.5 | chained |
| Example 13 | 90 | 56 | 10 | 1 | chained |
| Example 14 | 38 | 56 | 10 | 1 | chained |
| Example 15 | 40 | 28 | 1 | 1 | chained |
| Example 16 | 40 | 28 | 0.8 | 1 | chained |
| Example 17 | 40 | 28 | 12 | 1 | chained |
| Example 18 | 40 | 28 | 1 | 6 | plate |
| Example 19 | 40 | 28 | 1 | 1 | sheet |
| Comparative Example 1 | 40 | 15 | 10 | 1 | chained |
| Comparative Example 2 | 30 | 56 | 10 | 1 | chained |
| Comparative Example 3 | 40 | 20 | 1 | 1 | chained |
| Comparative Example 4 | 38 | 56 | 1 | 1 | chained |
| Example 20 | 40 | 28 | 10 | 1 | chained |
| Example 21 | 40 | 28 | 1 | 1 | chained |
| Example 22 | 40 | 28 | 1 | 6 | plate |
| Example 23 | 40 | 28 | 1 | 1 | sheet |
| Example 24 | 40 | 28 | 10 | 1 | chained |
| Example 25 | 40 | 28 | 1 | 1 | chained |
| Example 26 | 40 | 28 | 1 | 6 | plate |
| Example 27 | 40 | 28 | 1 | 1 | sheet |
| Comparative Example 5 | 40 | 28 | 1 | 1 | chained |
| Comparative Example 6 | 38 | 56 | 1 | 1 | chained |
| Comparative Example 7 | 40 | 20 | 1 | 1 | chained |

TABLE 3-continued

| | Thickness A of Active Material-Containing Layer [μm] | Maximum Length B of First Electro-conductive Agent [μm] | Average Particle Diameter C of Active Material Particle [μm] | Average Dimension D of Second Electro-conductive Agent [μm] | Shape of Second Electro-conductive Agent |
|---|---|---|---|---|---|
| Comparative Example 8 | 30 | 56 | 1 | 1 | chained |
| Comparative Example 9 | 40 | 20 | 1 | 1 | chained |
| Comparative Example 10 | 40 | 20 | 1 | 1 | chained |
| Example 28 | 40 | 28 | 10 | 1 | chained |
| Example 29 | 38 | 56 | 10 | 1 | chained |
| Comparative Example 11 | 40 | 15 | 10 | 1 | chained |

[Ratio B/A, Ratio C/B, Ratio C/D, and Cycle Life]

Each of the electrodes of Examples 1 to 14 and Comparative Examples 1 and 2 contains active material particles including monoclinic niobium-titanium composite oxide having the composition represented by formula $TiNb_2O_7$, and having carbon attached onto the surfaces thereof. Table 4 below shows the ratio B/A, ratio C/B, and ratio C/D of each electrode of these examples. Table 4 below further shows the relative value of the capacity retention ratio after 1000 cycles of the nonaqueous electrolyte battery of each example, with the capacity retention ratio after 1000 cycles of the nonaqueous electrolyte battery of Comparative Example 1 as a reference (1.000).

Each of the electrodes of Examples 15 to 19 and Comparative Examples 3 and 4 contains active material particles including monoclinic niobium-titanium composite oxide having the composition represented by formula $TiNb_2O_7$. Table 5 below shows the ratio B/A, ratio C/B, and ratio C/D of each electrode of these examples. Table 5 below further shows the relative value of the capacity retention ratio after 1000 cycles of the nonaqueous electrolyte battery of each example, with the capacity retention ratio after 1000 cycles of the nonaqueous electrolyte battery of Comparative Example 3 as a reference (1.000).

Each of the electrodes of Examples 20 to 23 and Comparative Example 9 contains active material particles including orthorhombic titanium-containing composite oxide having the composition represented by formula $Li_2Na_{1.6}Ti_{5.6}Nb_{0.4}O_{14}$. Table 6 below shows the ratio B/A, ratio C/B, and ratio C/D of each electrode of these examples. Table 6 below further shows the relative value of the capacity retention ratio after 1000 cycles of the nonaqueous electrolyte battery of each example, with the capacity retention ratio after 1000 cycles of the nonaqueous electrolyte battery of Comparative Example 9 as a reference (1.000).

Each of the electrodes of Examples 24 to 27 and Comparative Example 10 contains active material particles including monoclinic titanium dioxide ($TiO_2(B)$) having the composition represented by formula $TiO_2$. Table 7 below shows the ratio B/A, ratio C/B, and ratio C/D of each electrode of these examples. Table 7 below further shows the relative value of the capacity retention ratio after 1000 cycles of the nonaqueous electrolyte battery of each example, with the capacity retention ratio after 1000 cycles of the nonaqueous electrolyte battery of Comparative Example 10 as a reference (1.000).

Each of the electrodes of Comparative Examples 5 to 8 contains active material particles including spinel lithium titanate having the composition represented by formula $Li_4Ti_5O_{12}$. Table 8 below shows the ratio B/A, ratio C/B, and ratio C/D of each electrode of these examples. Table 8 below further shows the relative value of the capacity retention ratio after 1000 cycles of the nonaqueous electrolyte battery of each example, with the capacity retention ratio after 1000 cycles of the nonaqueous electrolyte battery of Comparative Example 8 as a reference (1.000).

Each of the electrodes of Examples 28 and 29, and Comparative Example 11 contains active material particles including monoclinic niobium-titanium composite oxide having the composition represented by formula $TiNb_2O_7$, and having carbon attached onto the surfaces thereof, and water-soluble binders. Table 9 below shows the ratio B/A, ratio C/B, and ratio C/D of each electrode of these examples. Table 9 below further shows the relative value of the capacity retention ratio after 1000 cycles of the nonaqueous electrolyte battery of each example, with the capacity retention ratio after 1000 cycles of the nonaqueous electrolyte battery of Comparative Example 11 as a reference (1.000).

TABLE 4

| | Ratio B/A | Ratio C/B | Ratio C/D | Relative Value of Capacity Retention Ratio After 1000 Cycles (Reference:Comparative Example 1) |
|---|---|---|---|---|
| Example 1 | 0.7 | 0.357 | 10 | 1.075 |
| Example 2 | 1.025 | 0.244 | 10 | 1.113 |
| Example 3 | 0.6 | 0.417 | 10 | 1.038 |
| Example 4 | 1.4 | 0.179 | 10 | 1.125 |
| Example 5 | 0.7 | 0.250 | 7 | 1.063 |
| Example 6 | 0.7 | 0.714 | 20 | 1.100 |
| Example 7 | 0.6 | 0.667 | 10 | 1.100 |
| Example 8 | 0.6 | 0.667 | 10 | 1.088 |
| Example 9 | 0.6 | 0.667 | 10 | 1.113 |
| Example 10 | 0.7 | 0.357 | 1.667 | 1.025 |
| Example 11 | 0.7 | 0.357 | 10 | 1.138 |
| Example 12 | 0.7 | 0.357 | 20 | 1.125 |
| Example 13 | 0.622 | 0.179 | 10 | 1.025 |
| Example 14 | 1.474 | 0.179 | 10 | 1.125 |
| Comparative Example 1 | 0.375 | 0.667 | 10 | 1.000 |
| Comparative Example 2 | 1.87 | 0.179 | 10 | 1.013 |

TABLE 5

|  | Ratio B/A | Ratio C/B | Ratio C/D | Relative Value of Capacity Retention Ratio After 1000 Cycles (Reference:Comparative Example 3) |
|---|---|---|---|---|
| Example 15 | 0.7 | 0.036 | 1 | 1.171 |
| Example 16 | 0.7 | 0.029 | 0.8 | 1.171 |
| Example 17 | 0.7 | 0.429 | 12 | 1.214 |
| Example 18 | 0.7 | 0.036 | 0.17 | 1.129 |
| Example 19 | 0.7 | 0.036 | 1 | 1.243 |
| Comparative Example 3 | 0.5 | 0.050 | 1 | 1.000 |
| Comparative Example 4 | 1.87 | 0.018 | 1 | 1.042 |

TABLE 6

|  | Ratio B/A | Ratio C/B | Ratio C/D | Relative Value of Capacity Retention Ratio After 1000 Cycles (Reference:Comparative Example 9) |
|---|---|---|---|---|
| Example 20 | 0.7 | 0.357 | 10 | 1.076 |
| Example 21 | 0.7 | 0.036 | 1 | 1.051 |
| Example 22 | 0.7 | 0.036 | 0.17 | 1.013 |
| Example 23 | 0.7 | 0.036 | 1 | 1.114 |
| Comparative Example 9 | 0.5 | 0.05 | 1 | 1.000 |

TABLE 7

|  | Ratio B/A | Ratio C/B | Ratio C/D | Relative Value of Capacity Retention Ratio After 1000 Cycles (Reference:Comparative Example 10) |
|---|---|---|---|---|
| Example 24 | 0.7 | 0.357 | 10 | 1.093 |
| Example 25 | 0.7 | 0.036 | 1 | 1.067 |
| Example 26 | 0.7 | 0.036 | 0.17 | 1.040 |
| Example 27 | 0.7 | 0.036 | 1 | 1.133 |
| Comparative Example 10 | 0.5 | 0.05 | 1 | 1.000 |

TABLE 8

|  | Ratio B/A | Ratio C/B | Ratio C/D | Relative Value of Capacity Retention Ratio After 1000 Cycles (Reference:Comparative Example 8) |
|---|---|---|---|---|
| Comparative Example 5 | 0.7 | 0.036 | 1 | 1.000 |
| Comparative Example 6 | 0.7 | 0.018 | 1 | 1.000 |
| Comparative Example 7 | 1.47 | 0.05 | 1 | 1.000 |
| Comparative Example 8 | 0.5 | 0.018 | 1 | 1.000 |

TABLE 9

|  | Ratio B/A | Ratio C/B | Ratio C/D | Relative Value of Capacity Retention Ratio After 1000 Cycles (Reference:Comparative Example 11) |
|---|---|---|---|---|
| Example 28 | 0.7 | 0.357 | 10 | 1.088 |
| Example 29 | 1.474 | 0.179 | 10 | 1.138 |
| Comparative Example 11 | 0.357 | 0.667 | 10 | 1.000 |

The results in Table 4 show that the electrodes of Examples 1 to 14 for which the ratio B/A was from 0.6 to 1.5 were able to achieve a more excellent cycle life than Comparative Example 1 for which the ratio B/A was less than 0.6 and Comparative Example 2 for which the ratio B/A exceeded 1.5.

Furthermore, the results in Table 5 show that the electrodes of Examples 15 to 19 for which the ratio B/A was in the range of from 0.6 to 1.5 were able to achieve a more excellent cycle life than Comparative Example 3 for which the ratio B/A was less than 0.6 and Comparative Example 4 for which the ratio B/A exceeded 1.5. Although not shown in Table 5, the capacity retention ratio after 1000 cycles of each of the electrodes of Examples 15 to 19 was 79% or more. This result shows that each of the electrodes of Examples 15 to 19 including the active material particles of the monoclinic niobium-titanium composite oxide not coated with carbon can realize an excellent cycle life.

In addition, the results in Table 6 show that the electrodes of Examples 20 to 23 for which the ratio B/A was in the range of from 0.6 to 1.5 were able to achieve a cycle life superior to that of Comparative Example 9 for which the ratio B/A was less than 0.6. Similarly, the results in Table 7 show that the electrodes of Examples 24 to 27 for which the ratio B/A was in the range of from 0.6 to 1.5 were able to achieve a cycle life superior to that of Comparative Example 10 for which the ratio B/A was less than 0.6.

The results in Table 9 show that the electrodes of Examples 28 and 29 for which the ratio B/A was in the range of from 0.6 to 1.5 were able to achieve a cycle life superior to that of Comparative Example 11 for which the ratio B/A was less than 0.6. The results in Tables 4 to 7 and 9 show that each of the batteries of Examples 28 and 29, using as the binders carboxymethyl cellulose (CMC) and styrene butadiene rubber (SBR) which are water-soluble binders, were able to exhibit an excellent cycle life in a manner similar to the batteries of Examples 1 to 27 using polyvinylidene fluoride as the binder.

These results show that an excellent cycle life was achieved by the electrode including an active material-containing layer including active material particles containing at least one compound selected from the group consisting of a monoclinic titanium-containing oxide and a orthorhombic titanium-containing composite oxide, a fibrous first electro-conductive agent, and a second electro-conductive agent having a shape other than a fibrous shape, and having ratio B/A satisfying $0.6 \leq B/A \leq 1.5$.

On the other hand, the results in Table 8 show that the cycle life of the electrode including the active material-containing layer including active material particles of spinel lithium titanate does not change even when the ratio B/A is in the range of from 0.6 to 1.5.

The electrode of these at least one embodiment and example includes an active material-containing layer. The active material-containing layer includes active material particles, a fibrous first electro-conductive agent, and a second electro-conductive agent having a shape besides fibrous. The active material particles include at least one compound selected from the group consisting of a monoclinic titanium-containing oxide and an orthorhombic titanium-containing composite oxide. The active material-containing layer satisfies formula (1): $0.6 \leq B/A \leq 1.5$. Thereby, with the electrode, even when the active material-containing layer undergoes volume change, electrical conduction paths among active material particles can be maintained. As a result, the electrode can realize a battery that can exhibit excellent cycle life.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An electrode comprising:
a current collector; and
an active material-containing layer on a surface of the current collector,
the active material-containing layer comprising:
active material particles, the active material particles comprising at least one compound selected from the group consisting of a monoclinic titanium-containing oxide and an orthorhombic titanium-containing composite oxide;
a first electro-conductive agent having a fibrous shape; and
a second electro-conductive agent having a shape other than the fibrous shape,
the active material-containing layer satisfying formula (1): $0.6 \leq B/A \leq 1.5$, where A is a thickness [$\mu$m] of the active material-containing layer, and B is a maximum length [$\mu$m] of the first electro-conductive agent in the active material-containing layer.

2. The electrode according to claim 1, wherein
the at least one compound comprises the monoclinic titanium-containing oxide, and
the monoclinic titanium-containing oxide comprises a monoclinic niobium-titanium composite oxide.

3. The electrode according to claim 1, wherein the first electro-conductive agent comprises at least one selected from the group consisting of a carbon nanotube and a carbon nanofiber.

4. The electrode according to claim 1, wherein the second electro-conductive agent comprises at least one selected from the group consisting of carbon black, graphite, graphene, and hard carbon.

5. The electrode according to claim 1, wherein the active material-containing layer further comprises a binder,
the binder comprising at least one selected from the group consisting of styrene butadiene rubber, acrylic acid, and carboxymethyl cellulose.

6. The electrode according to claim 1, wherein the thickness A of the active material-containing layer is from 25 $\mu$m to 70 $\mu$m.

7. The electrode according to claim 1, wherein the active material particles, the first electro-conductive agent, and the second electro-conductive agent are in a dispersed state within the active material-containing layer.

8. The electrode according to claim 1, wherein the active material-containing layer further comprises a binder, and
the active material-containing layer comprises from 86% by mass to 92% by mass of the active material particles, from 0.5% by mass to 5% by mass of the first electro-conductive agent, from 2% by mass to 7% by mass of the second electro-conductive agent, and from 2% by mass to 6% by mass of the binder.

9. A battery comprising:
the electrode according to claim 1 as a negative electrode;
a positive electrode; and
an electrolyte.

10. A battery pack comprising the battery according to claim 9.

* * * * *